United States Patent
Pankaj et al.

(10) Patent No.: US 11,828,235 B2
(45) Date of Patent: Nov. 28, 2023

(54) GEARBOX FOR A GAS TURBINE ENGINE UTILIZING SHAPE MEMORY ALLOY DAMPERS

(71) Applicant: General Electric Company, Schenectady, NY (US)

(72) Inventors: Peeyush Pankaj, Bangalore (IN); Narayanan Payyoor, Bangalore (IN); Shashank Suresh Puranik, Bangalore (IN); Arvind Kumar Rao, Bangalore (IN); Praveen Sharma, Bangalore (IN); Chirayu Pradip Inamdar, Bangalore (IN); Vidyashankar Ramasastry Buravalla, Bangalore (IN); Sankarapandian Palaniappan, Bangalore (IN); Sampath Karthikeyan, Bangalore (IN)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 17/473,233

(22) Filed: Sep. 13, 2021

(65) Prior Publication Data
US 2022/0178310 A1     Jun. 9, 2022

(30) Foreign Application Priority Data
Dec. 8, 2020    (IN) .............................. 202011053386

(51) Int. Cl.
*F02C 7/36*        (2006.01)
*F16H 57/02*      (2012.01)
(Continued)

(52) U.S. Cl.
CPC ........... *F02C 7/36* (2013.01); *F16H 57/0006* (2013.01); *F16H 57/02* (2013.01);
(Continued)

(58) Field of Classification Search
CPC ........ F02C 7/36; F16H 57/0006; F16H 57/02; F16H 2057/02039; F16H 2057/085;
(Continued)

(56) References Cited

U.S. PATENT DOCUMENTS

| | | | |
|---|---|---|---|
| 1,626,188 | A | 4/1927 | De Ram et al. |
| 2,445,661 | A | 7/1948 | Constant et al. |

(Continued)

FOREIGN PATENT DOCUMENTS

| | | | |
|---|---|---|---|
| CA | 2841592 | A1 | 10/2014 |
| CA | 2861292 | A1 | 6/2015 |

(Continued)

OTHER PUBLICATIONS

Barbarino et al., A review on shape memory alloys with applications to morphing aircraft, Smart Materials and Structures, vol. 23, Issue: 6, Apr. 10, 2014, 19 Pages.

(Continued)

*Primary Examiner* — Yi-Kai Wang
(74) *Attorney, Agent, or Firm* — Dority & Manning, P.A.

(57) ABSTRACT

An epicyclic gearbox is configured to transfer rotational motion between a first rotating component and a second rotating component of the gas turbine engine. The gearbox includes a centrally located sun gear, two or more planet gears circumscribing the sun gear, and a ring gear circumscribing the plurality of planet gears. The gearbox is configured such that the sun gear is drivingly coupled to the first rotating component, such that rotation of the sun gear causes rotation of each planet gear, and such that the ring gear rotates relative to the plurality of planet gears. The gearbox includes one or more shape memory alloy dampers provided in association with the sun gear, the ring gear, and/or the plurality of planet gears. The shape memory alloy damper(s) is configured in order to reduce vibrations transferred (Continued)

through the epicyclic gearbox to the frame, the first rotating component, and/or the second rotating component.

16 Claims, 10 Drawing Sheets

(51) Int. Cl.
  *F16H 57/00* (2012.01)
  *F16H 57/08* (2006.01)
(52) U.S. Cl.
  CPC .............. *F05D 2220/32* (2013.01); *F05D 2260/40311* (2013.01); *F05D 2260/96* (2013.01); *F16F 2222/02* (2013.01); *F16F 2224/0258* (2013.01); *F16H 2057/02039* (2013.01); *F16H 2057/085* (2013.01)
(58) Field of Classification Search
  CPC .......... F16H 57/08; F16H 57/082; F16H 1/28; F16H 57/023; F16H 57/028; F05D 2220/32; F05D 2260/40311; F05D 2260/96; F05D 2300/505; F16F 2222/02; F16F 2224/0258
  USPC ....................................................... 415/119
  See application file for complete search history.

(56) References Cited

U.S. PATENT DOCUMENTS

| | | |
|---|---|---|
| 4,214,796 A | 7/1980 | Monzel et al. |
| 4,289,061 A | 9/1981 | Emmett |
| 4,451,110 A | 5/1984 | Forestier et al. |
| 4,496,252 A | 1/1985 | Horler et al. |
| 4,527,910 A | 7/1985 | Fleming |
| 4,676,667 A | 6/1987 | Komatsu et al. |
| 4,897,006 A | 1/1990 | Blin |
| 4,971,458 A | 11/1990 | Carlson |
| 4,991,991 A | 2/1991 | Ito et al. |
| 5,010,949 A | 4/1991 | Dehaine |
| 5,052,828 A | 10/1991 | Ciokajlo et al. |
| 5,067,827 A | 11/1991 | Bokel |
| 5,088,840 A | 2/1992 | Radtke |
| 5,160,233 A | 11/1992 | McKinnis |
| 5,320,134 A | 6/1994 | Singh |
| 5,366,254 A | 11/1994 | Tucchio et al. |
| 5,398,916 A * | 3/1995 | Kramer .................. F16F 7/01 |
| | | 148/402 |
| 5,421,655 A | 6/1995 | Ide et al. |
| 5,484,244 A | 1/1996 | Glovan et al. |
| 5,791,789 A | 8/1998 | Van Duyn et al. |
| 5,974,782 A | 11/1999 | Gerez |
| 6,009,701 A | 1/2000 | Freeman et al. |
| 6,082,959 A | 7/2000 | Van Duyn |
| 6,099,165 A | 8/2000 | Tremaine |
| 6,109,022 A | 8/2000 | Allen et al. |
| 6,126,371 A | 10/2000 | McCloskey |
| 6,240,719 B1 | 6/2001 | Vondrell et al. |
| 6,325,546 B1 | 12/2001 | Storace |
| 6,413,046 B1 | 7/2002 | Penn et al. |
| 6,428,634 B1 | 8/2002 | Besselink et al. |
| 6,491,497 B1 | 12/2002 | Allmon et al. |
| 6,494,032 B2 | 12/2002 | Udall et al. |
| 6,540,483 B2 | 4/2003 | Allmon et al. |
| 6,783,319 B2 | 8/2004 | Doerflein et al. |
| 6,796,408 B2 | 9/2004 | Sherwin et al. |
| 6,799,416 B2 | 10/2004 | Plona et al. |
| 7,004,047 B2 | 2/2006 | Rey et al. |
| 7,097,413 B2 | 8/2006 | VanDuyn |
| 7,195,444 B2 | 3/2007 | Brault et al. |
| 7,216,831 B2 | 5/2007 | Wood |
| 7,288,326 B2 | 10/2007 | Elzey et al. |
| 7,367,776 B2 | 5/2008 | Albers et al. |
| 7,384,199 B2 | 6/2008 | Allmon et al. |
| 7,404,678 B2 | 7/2008 | Plona |
| 7,448,808 B2 | 11/2008 | Bouchy et al. |
| 7,524,112 B2 | 4/2009 | Gerez et al. |
| 7,628,542 B2 | 12/2009 | Wada et al. |
| 7,648,278 B2 | 1/2010 | Stout et al. |
| 7,669,799 B2 | 3/2010 | Elzey et al. |
| 7,699,556 B2 | 4/2010 | Efremov |
| 7,749,341 B2 | 7/2010 | Noebe et al. |
| 7,797,922 B2 | 9/2010 | Eleftheriou et al. |
| 7,832,193 B2 | 11/2010 | Orlando et al. |
| 7,926,259 B2 | 4/2011 | Orlando et al. |
| 8,100,638 B2 | 1/2012 | Udall |
| 8,128,339 B2 | 3/2012 | Kondo et al. |
| 8,136,999 B2 | 3/2012 | Mons et al. |
| 8,167,531 B2 | 5/2012 | Mollmann et al. |
| 8,182,156 B2 | 5/2012 | Kinnaird et al. |
| 8,209,834 B2 | 7/2012 | Mons et al. |
| 8,225,478 B2 | 7/2012 | Kane |
| 8,246,255 B2 | 8/2012 | Raberin et al. |
| 8,267,650 B2 | 9/2012 | Alam et al. |
| 8,282,285 B2 | 10/2012 | Brillon |
| 8,291,710 B2 | 10/2012 | Webster |
| 8,322,038 B1 | 12/2012 | Heidari et al. |
| 8,337,090 B2 | 12/2012 | Herborth et al. |
| 8,371,802 B2 | 2/2013 | Udall |
| 8,403,634 B2 | 3/2013 | Arness et al. |
| 8,409,691 B1 | 4/2013 | Henry et al. |
| 8,430,622 B2 | 4/2013 | Webster et al. |
| 8,434,293 B2 | 5/2013 | Widdle, Jr. et al. |
| 8,500,406 B2 | 8/2013 | Jimenez et al. |
| 8,591,196 B2 | 11/2013 | Hardwicke |
| 8,662,756 B2 | 3/2014 | Care et al. |
| 8,726,652 B1 | 5/2014 | Gunter |
| 8,727,629 B2 | 5/2014 | Do et al. |
| 8,727,632 B2 | 5/2014 | Do et al. |
| 8,814,097 B2 | 8/2014 | Schnitzer |
| 8,821,029 B2 | 9/2014 | Antunes et al. |
| 8,830,026 B2 | 9/2014 | Mooney et al. |
| 8,834,095 B2 | 9/2014 | Davis |
| 8,939,709 B2 | 1/2015 | Nanukuttan et al. |
| 8,945,325 B2 | 2/2015 | Everhart et al. |
| 8,986,146 B2 | 3/2015 | Gallet |
| 9,016,952 B2 | 4/2015 | Bedenk |
| 9,140,137 B2 | 9/2015 | Mayer et al. |
| 9,180,982 B2 | 11/2015 | Baghasarian |
| 9,279,449 B2 | 3/2016 | Rouesne |
| 9,599,149 B2 | 3/2017 | Ryu |
| 9,683,600 B2 | 6/2017 | Park |
| 9,796,581 B2 | 10/2017 | Landais et al. |
| 9,850,814 B2 | 12/2017 | Grogg |
| 9,869,205 B2 | 1/2018 | Gainger et al. |
| 9,926,975 B2 | 3/2018 | Smedresman et al. |
| 10,041,534 B2 | 8/2018 | Ganiger et al. |
| 10,196,934 B2 | 2/2019 | Khan et al. |
| 10,233,997 B2 | 3/2019 | Howard et al. |
| 10,584,751 B2 | 3/2020 | Ghosh et al. |
| 10,724,400 B2 | 7/2020 | Ac et al. |
| 10,794,222 B1 | 10/2020 | Ganiger et al. |
| 10,823,228 B2 | 11/2020 | Ganiger et al. |
| 11,021,998 B2 | 6/2021 | Ganiger et al. |
| 11,105,223 B2 | 8/2021 | Ganiger et al. |
| 2005/0222683 A1 | 10/2005 | Beny |
| 2006/0169857 A1 | 8/2006 | Hawkins et al. |
| 2006/0204153 A1 | 9/2006 | Alam et al. |
| 2006/0269357 A1 | 11/2006 | Webb |
| 2007/0031078 A1 | 2/2007 | Hackett |
| 2008/0152483 A1 | 6/2008 | Godleski |
| 2008/0181763 A1 | 7/2008 | Webster et al. |
| 2008/0213062 A1 | 9/2008 | Johnson et al. |
| 2009/0089973 A1 * | 4/2009 | Lee .......................... H05B 3/46 |
| | | 29/505 |
| 2009/0097971 A1 * | 4/2009 | Dakowski ............... F01D 5/081 |
| | | 415/119 |
| 2009/0148274 A1 | 6/2009 | Kostka et al. |
| 2009/0185768 A1 | 7/2009 | Mons et al. |
| 2009/0246081 A1 | 10/2009 | Nichols et al. |
| 2010/0011493 A1 | 1/2010 | Wiig et al. |
| 2011/0150378 A1 | 6/2011 | Care et al. |
| 2011/0286836 A1 | 11/2011 | Davis |

(56) References Cited

U.S. PATENT DOCUMENTS

| | | |
|---|---|---|
| 2012/0056005 A1 | 3/2012 | Webster |
| 2012/0213629 A1 | 8/2012 | Rouesne |
| 2012/0263578 A1 | 10/2012 | Davis et al. |
| 2013/0108202 A1 | 5/2013 | Do et al. |
| 2013/0280063 A1 | 10/2013 | Ganiger et al. |
| 2013/0302168 A1 | 11/2013 | Kray et al. |
| 2013/0324343 A1 | 12/2013 | Gallet |
| 2013/0331223 A1 | 12/2013 | McCune et al. |
| 2014/0369830 A1 | 12/2014 | Fletcher et al. |
| 2015/0010387 A1* | 1/2015 | Daimer ............. F04D 29/4206 267/161 |
| 2015/0098826 A1 | 4/2015 | Carter et al. |
| 2015/0144256 A1 | 5/2015 | Fabre et al. |
| 2015/0308510 A1 | 10/2015 | Long et al. |
| 2016/0169281 A1* | 6/2016 | Ertas ................. F16C 32/0662 384/119 |
| 2016/0229519 A1 | 8/2016 | Dilligan et al. |
| 2017/0030221 A1 | 2/2017 | Hopper et al. |
| 2017/0108110 A1* | 4/2017 | Sheridan ............ F16H 57/0423 |
| 2017/0145855 A1 | 5/2017 | Ganiger et al. |
| 2017/0226894 A1 | 8/2017 | Ganiger et al. |
| 2017/0226927 A1 | 8/2017 | Ganiger et al. |
| 2017/0234157 A1 | 8/2017 | Khan et al. |
| 2017/0248191 A1 | 8/2017 | Husband et al. |
| 2018/0112554 A1 | 4/2018 | Ghosh et al. |
| 2018/0112672 A1 | 4/2018 | Ganiger et al. |
| 2018/0135596 A1 | 5/2018 | Herrig et al. |
| 2018/0252165 A1* | 9/2018 | Blaney ................. F16H 57/025 |
| 2018/0283490 A1* | 10/2018 | Nakamura ............. F16F 15/22 |
| 2018/0298822 A1 | 10/2018 | Ac et al. |
| 2018/0306241 A1* | 10/2018 | Ciciriello ............... F16C 27/04 |
| 2019/0128329 A1 | 5/2019 | Ghosh et al. |
| 2019/0145277 A1 | 5/2019 | Ghosh et al. |
| 2019/0162077 A1 | 5/2019 | Ghosh et al. |
| 2019/0178104 A1 | 6/2019 | Joshi et al. |
| 2021/0039799 A1 | 2/2021 | Sharma et al. |
| 2021/0040864 A1 | 2/2021 | Ganiger et al. |
| 2021/0040865 A1 | 2/2021 | Gainger et al. |

FOREIGN PATENT DOCUMENTS

| | | |
|---|---|---|
| CN | 1506588 A | 6/2004 |
| CN | 102889099 | 1/2013 |
| CN | 104285036 | 1/2015 |
| CN | 104968896 | 10/2015 |
| EP | 1130243 A2 | 9/2001 |
| EP | 1344896 A1 | 9/2003 |
| EP | 1975429 A2 | 10/2008 |
| EP | 2149681 A2 | 2/2010 |
| EP | 2339131 A1 | 6/2011 |
| EP | 2479406 A2 | 7/2012 |
| EP | 2667046 A2 | 11/2013 |
| EP | 3115551 A1 | 1/2017 |
| FR | 2888621 A1 | 1/2007 |
| FR | 2938874 A1 | 11/2008 |
| GB | 2444935 A | 6/2008 |
| JP | H06200933 A | 7/1994 |
| WO | WO2010/001716 A1 | 1/2010 |
| WO | WO2015/069353 A2 | 5/2015 |
| WO | WO2015/130370 A2 | 9/2015 |
| WO | WO2017/205315 A1 | 11/2017 |

OTHER PUBLICATIONS

Ertas et al., Dynamic Characteristics of Shape Memory Alloy Metal Mesh Dampers, GE Global Research Center, AIAA 2009-2521, $50^{th}$ AIAA/ASME/ASCE/AHS/ASC Structures, Structural Dynamics, and Materials Conference $17^{th}$, Palm Springs, CA, May 4-7, 2009, 8 Pages.

SMB Bearings, United Kingdom, 2018, 1 page. https://www.smbbearings.com/downloads.

Stebner, Development, Characterization, and Application of Ni19.5Ti50.5Pd25Pt5 High-Temperature Shape Memory Alloy Helical Actuators, Engineering, Aerospace, Thesis, Dec. 2007, 110 Pages.

Wischt et al., Variable Stiffness Technique for Turbomachinery using Shape Memory Alloys, 56th AIAA/ASCE/AHS/ASC Structures, Structural Dynamics, and Materials Conference, Florida, Jan. 2015, 13 Pages.

YouTube Video (Website Link Only) https://www.youtube.com/watch?v=X2KCs_IBKWU.

* cited by examiner

GEARBOX FOR A GAS TURBINE ENGINE UTILIZING SHAPE MEMORY ALLOY DAMPERS

PRIORITY INFORMATION

The present application claims priority to Indian Patent Application Number 202011053386 filed on Dec. 8, 2020.

FIELD

The present subject matter relates generally to a gearbox for a gas turbine engine, or, more particularly, a gearbox for a gas turbine engine having dampers including a shape memory alloy material to reduce vibrations transferred through the gearbox.

BACKGROUND

A gas turbine engine generally includes a turbomachine and a rotor assembly. In the case of a turbofan engine, the rotor assembly may be configured as a fan assembly. The turbomachine generally includes a high pressure, high speed spool and a low pressure, low speed spool. A combustion section receives pressurized air, which is mixed with fuel and combusted within a combustion chamber to generate combustion gases. The combustion gases are provided first to a high pressure turbine of the high pressure spool, driving the high pressure spool, and subsequently to a low speed turbine of the low speed spool, driving the low speed spool. The rotor assembly is typically coupled to the low speed spool.

The low pressure spool can drive the fan through a power gearbox, which allows the fan to be rotated at fewer revolutions per unit of time than the rotational speed of the low speed spool for greater efficiency. The power gearbox typically includes a sun gear, one or more planet gears, and a ring gear. In a typical epicyclic gearing arrangement, the gearbox rotatably supports the sun gear that is disposed centrally with respect to a ring gear and a plurality of planet gears, which are disposed around the sun gear and engage between the sun gear and the ring gear. The low-speed spool provides the input to the epicyclic gearing arrangement by being coupled to the sun gear, while the fan can be coupled to rotate in unison with a carrier of the planet gears or with the ring gear, depending upon whether a star gearbox or a planetary gearbox is used. Each planet gear meshes with the sun gear and with the ring gear. One of the carrier or the ring gear may be held stationary, but not both. Such a gearbox may be subjected to various vibrations transferred through the gearbox between the one or more spools of the gas turbine engine, between a spool of the gas turbine and the gearbox, or between the gearbox and a static structure of the gas turbine engine.

Accordingly, a gearbox for a gas turbine engine having one or more features for reducing vibrations transferred through the gearbox between the rotating components or between the rotating component(s) and static structure would be useful.

BRIEF DESCRIPTION

Aspects and advantages of the invention will be set forth in part in the following description, or may be obvious from the description, or may be learned through practice of the invention.

In one aspect, the present subject matter is directed to an epicyclic gearbox configured to be supported by a frame of a gas turbine engine and configured to transfer rotational motion between a first rotating component of the gas turbine engine and a second rotating component of the gas turbine engine. The gearbox includes a centrally located sun gear including a plurality of teeth. The sun gear is configured to be drivingly coupled to the first rotating component of the gas turbine engine. The epicyclic gearbox further includes two or more planet gears circumscribing the sun gear. Each of the planet gears includes a plurality of teeth configured to mesh with the teeth of the sun gear such that rotation of the sun gear causes rotation of each planet gear. Additionally, the gearbox includes a ring gear circumscribing the plurality of planet gears. The ring gear includes a plurality of teeth configured to mesh with the teeth of each of the planet gears such that the ring gear rotates relative to the planet gears. Further, the gearbox includes one or more shape memory alloy dampers provided in association with the sun gear, the ring gear, and/or the plurality of planet gears. The shape memory alloy damper(s) is configured in order to reduce vibrations transferred through the epicyclic gearbox to the frame of the gas turbine engine, the first rotating component, and/or the second rotating component.

In another aspect, the present subject matter is directed to a gas turbine engine defining a central axis. The gas turbine engine includes a frame, a turbine section including a turbine, and a fan assembly including a fan. The gas turbine engine additionally includes an epicyclic gearbox supported by the frame and drivingly coupling the turbine of the turbine section to the fan of the fan assembly. The epicyclic gearbox includes a centrally located sun gear including a plurality of teeth. The sun gear is drivingly coupled to the turbine of the turbine section. The epicyclic gearbox also includes two or more planet gears circumscribing the sun gear. Each of the planet gears includes a plurality of teeth configured to mesh with the teeth of the sun gear such that rotation of the sun gear causes rotation of each planet gear. The epicyclic gearbox further includes a ring gear circumscribing the planet gears. The ring gear includes a plurality of teeth configured to mesh with the teeth of each of the planet gears such that the ring gear rotates relative to the plurality of planet gears. Additionally, the epicyclic gear box includes one or more shape memory alloy dampers provided in association with the sun gear, the ring gear, and/or the planet gears such that vibrations transferred through the epicyclic gearbox to the frame of the gas turbine engine, the turbine, and/or the fan are reduced.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
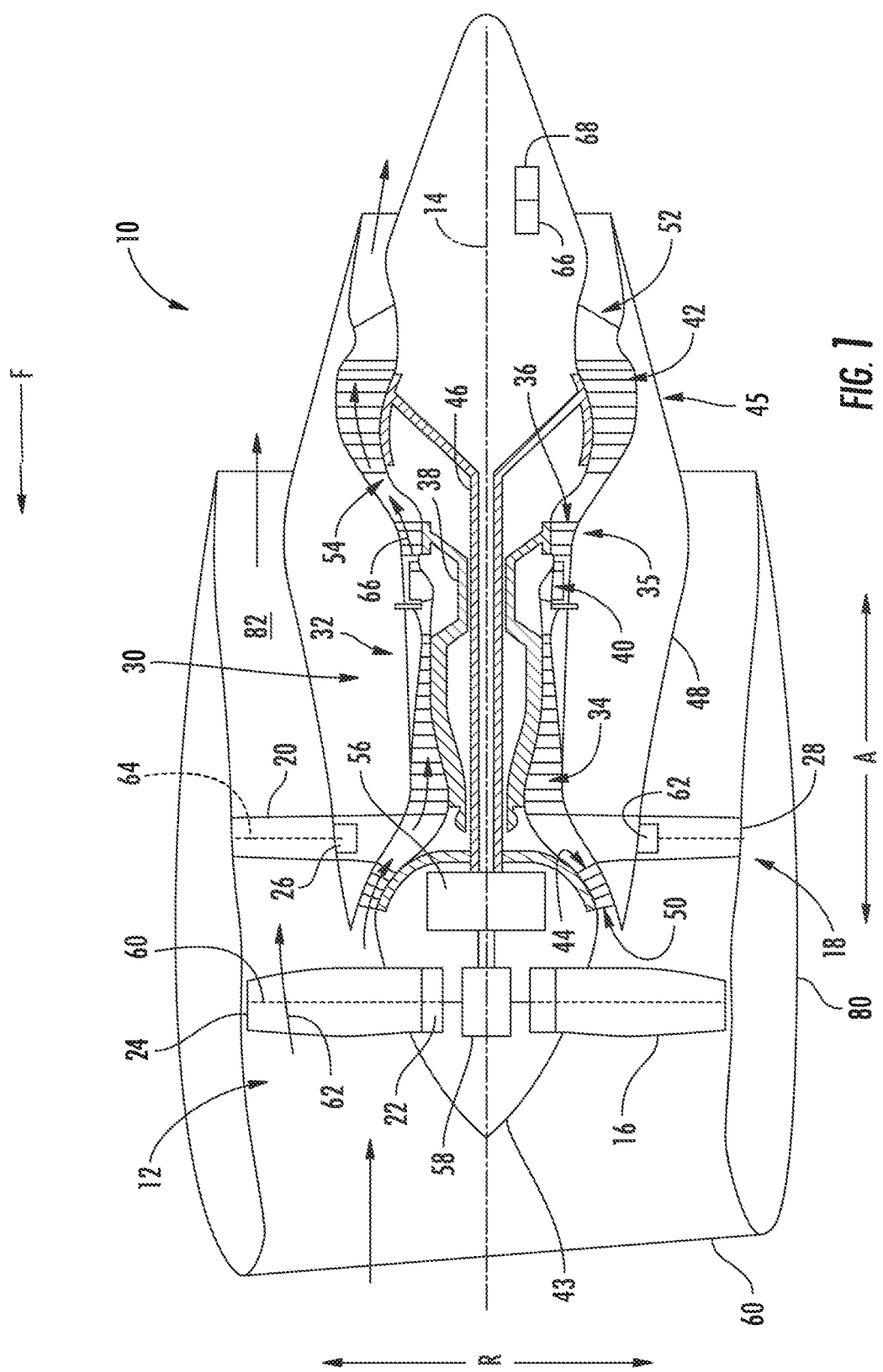
FIG. 1 is a schematic, cross-sectional view of a gas turbine engine in accordance with an exemplary aspect of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some embodiments, one or more components of the gas turbine engine described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the manufacture of gearboxes, components of gearboxes, shape memory alloy dampers suitable for use with such gearboxes, and/or shape memory alloy dampers suitable for use within a gas turbine engine or a fluid conduit system of a gas turbine engine. Such components may have unique features, configurations, thicknesses, materials, densities, fluid passageways, headers, and mounting structures that may not have been possible or practical using prior manufacturing methods. Some of these features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Referring now to the Drawings, FIG. 1 shows an elevational cross-sectional view of an exemplary embodiment of a gas turbine engine as may incorporate one or more inventive aspects of the present disclosure. In particular, the exemplary gas turbine engine of FIG. 1 is a configured as a single rotor, ducted engine 10 defining an axial direction A, a radial direction R, and a circumferential direction C (extending about the axial direction A). As is seen from FIG. 1, engine 10 takes the form of a closed rotor propulsion system and has a rotor assembly 12 (e.g., a fan assembly) which includes an array of airfoils arranged around a central longitudinal axis 14 of engine 10, and more particularly includes an array of rotor blades 16 arranged around the central longitudinal axis 14 of engine 10. Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 (e.g., outlet guide vanes) disposed around central axis 14.

The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 43 located forward of the plurality of rotor blades 16.

Additionally, the engine 10 includes a turbomachine 30 having core (or high speed system) 32 and a low speed system. The core 32 generally includes a high speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool 35 of the engine. Further, a combustion section 40 is located between the high speed compressor 34 and high speed turbine 36. The combustion section 40 may include one or more configurations for receiving a mixture of fuel and air and providing a flow of combustion gasses through the high speed turbine 36 for driving the high speed spool 35.

The low speed system similarly includes a low speed turbine 42, a low speed compressor or booster 44, and a low speed shaft 46 extending between and connecting the low speed compressor 44 and low speed turbine 42. The low speed compressor 44 (or at least the rotating components thereof), the low speed turbine 42 (or at least the rotating components thereof), and the low speed shaft 46 may collectively be referred to as a low speed spool 45 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52 and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18 and provides a path for incoming atmospheric air to enter the turbomachinery flowpath 54 (and compressors 44, 34, combustion section 40, and turbines 36, 42) inwardly of the guide vanes 20 along the radial direction R. Such a location may be advantageous for a variety of reasons, including management of icing performance as well as protecting the inlet 50 from various objects and materials as may be encountered in operation. However, in other embodiments, the inlet 50 may be positioned at any other suitable location, e.g., aft of the vane assembly 18, arranged in a non-axisymmetric manner, etc.

As briefly mentioned above, the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 20. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature, which may be useful in certain operating conditions, such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

As is depicted, the rotor assembly 12 is driven by the turbomachine 30, and more specifically, is driven by the low speed spool 45. More specifically, the engine 10 in the embodiment shown in FIG. 1 includes a power gearbox 56, and the rotor assembly 12 is driven by the low speed spool 45 of the turbomachine 30 across the power gearbox 56. The power gearbox 56 may include a gearset for decreasing a rotational speed of the low speed spool 45 relative to the low speed turbine 42, such that the rotor assembly 12 may rotate at a slower rotational speed than the low speed spool 45. In such a manner, the rotating rotor blades 16 of the rotor assembly 12 may rotate around the axis 14 and generate thrust to propel engine 10, and hence an aircraft to which it is associated, in a forward direction F. As further shown in FIG. 1, the exemplary engine 10 includes a nacelle 80 circumferentially surrounding at least in part the rotor assembly 12 and turbomachine 30, defining a bypass passage 82 therebetween.

Referring still to FIG. 1, the exemplary engine 10 includes an accessory gearbox 66 and an electric machine 68, with the turbomachine 30 driving the accessory gearbox 66 and the electric machine 68. For example, in certain exemplary embodiments, the accessory gearbox 66 may be coupled to the low speed spool 45 (e.g., the low speed shaft 46) through a suitable gear train and the electric machine 68 may be coupled to the accessory gearbox 66. However, in other exemplary embodiments, the electric machine 68 may be coupled to the low speed spool 45 of the turbomachine 30 independently of the accessory gearbox 66, and the accessory gearbox 66 may be coupled to either the low speed spool 45 or high speed spool 35.

It will be appreciated, however, that the exemplary, single rotor, ducted engine depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be an unducted engine, a turbofan engine, a turboshaft engine, a turboprop engine, turbojet engine, etc.

Figure 2:
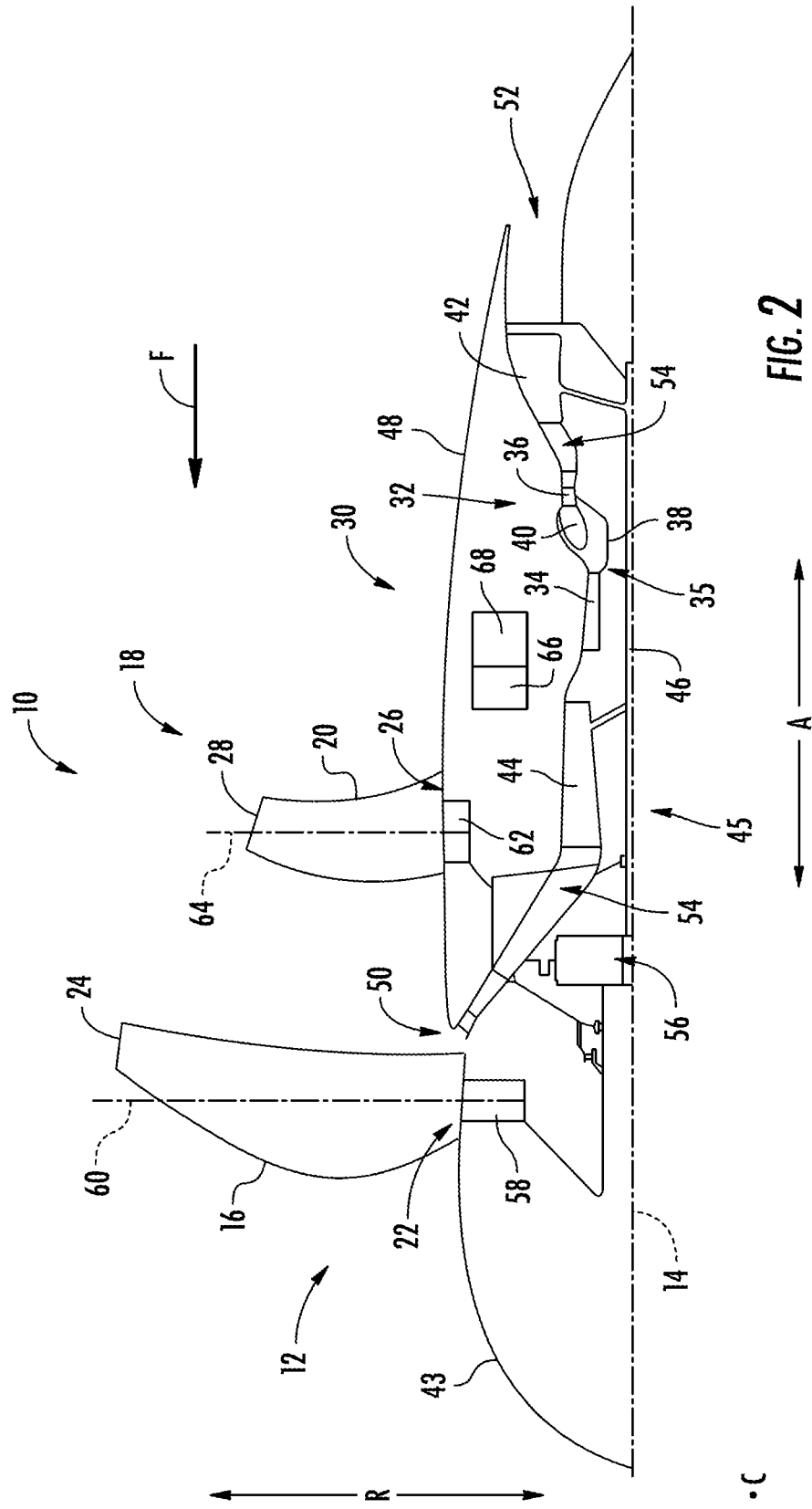
FIG. 2 is a schematic, cross-sectional view of a gas turbine engine in accordance with another exemplary embodiment of the present disclosure.

For example, referring now to FIG. 2, an elevational cross-sectional view of another exemplary embodiment of a gas turbine engine is disclosed as may incorporate one or more inventive aspects of the present disclosure. In particular, the exemplary gas turbine engine of FIG. 2 is a configured as a single rotor, unducted engine 10. The exemplary embodiment of FIG. 2 may be configured in substantially the same manner as the exemplary engine 10 described above with respect to FIG. 1, and the same or similar reference numerals may refer to the same or similar parts. For instance, in the depicted embodiment of FIG. 2, the engine 10 includes a rotor assembly 12 which includes an array of airfoils arranged around a central longitudinal axis 14 of engine 10, and more particularly includes an array of rotor blades 16 arranged around the central longitudinal axis 14 of engine 10. The exemplary engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14.

However, as will be appreciated, for the open rotor propulsion system embodiment shown in FIG. 2, the engine 10 includes both an array of rotor blades 16 and an array of vanes assembly which are unducted or open. In additional or alternative embodiments, it be appreciated that at least one array of rotor blades 16 or one array of vanes 20 may be ducted while at least one array of vanes 20 rotor blades 16 is in an open arrangement.

Figure 3:
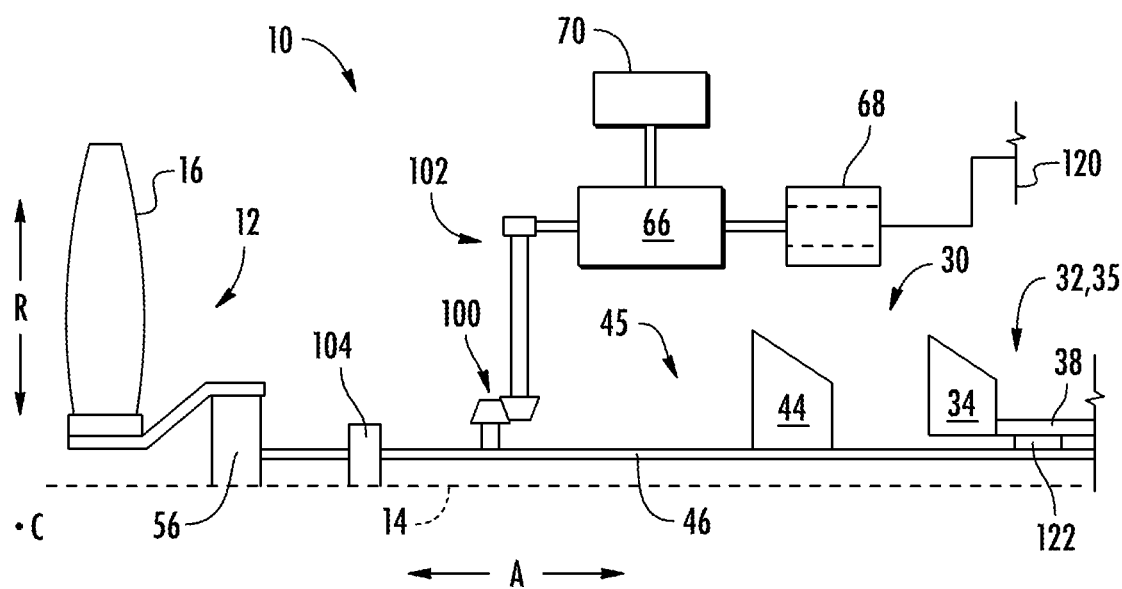
FIG. 3 is another schematic, cross-sectional view of a gas turbine engine in accordance with another exemplary aspect of the present disclosure.

Referring now to FIG. 3, a schematic view is depicted of a gas turbine engine 10 in accordance with an exemplary embodiment of the present disclosure. The exemplary gas turbine engine 10 of FIG. 3 may be configured in a similar manner as the exemplary engines 10 described above with respect to FIG. 1 or FIG. 2 or any other suitable gas turbine engine. Specifically, for the embodiment shown, the engine 10 includes an electric machine 68 mechanically coupled to a low speed spool 45 of a turbomachine 30 of the engine 10, and more specifically includes an accessory gearbox 66 mechanically coupled to a low speed spool 45 of the engine 10, with the electric machine 68 being coupled to the low speed spool 45 through the accessory gearbox 66. More specifically, still, the low speed spool 45 includes a low speed shaft 46 and forms at least in part a low speed compressor 44 and low speed turbine 42 (not shown). The accessory gearbox 66 is depicted coupled to the low speed shaft 46 of the low speed spool 45.

In such a manner, the accessory gearbox 66 may transfer rotational power from the low speed spool 45 of the engine 10 to, e.g., one or more accessory systems 70 of the engine 10 or aircraft incorporating the engine 10 that are mechanically coupled to the accessory gearbox 66 and the electric machine 68 (which is rotatable with the accessory gearbox 66). The engine 10 further includes a rotor assembly 12 and a power gearbox 56, with the rotor assembly 12 being driven by the low speed spool 45 across the power gearbox 56. More specifically, for the embodiment shown, the power gearbox 56 defines a gear ratio for reducing the rotational speed of the rotor assembly 12 relative to the low pressure spool 45. In at least certain exemplary embodiments, the gear ratio may be greater than or equal to about 4:1 and less than or equal to about 12:1. For example, in certain exemplary embodiments, the gear ratio may be between greater than or equal to about 7:1 and less than or equal to about 12:1. In such a case, the power gearbox 56 may be a multi-stage or compound power gearbox (e.g., a planetary gearbox having compound planet gears, etc.).

As will be appreciated, the various electrical and other accessory systems of a gas turbine engine 10 are typically powered off an accessory gearbox driven by a core 32 of the engine 10, or more specifically, the high speed/high pressure system of the engine 10. With such a configuration, the engine core 32 is generally oversized to allow for operation of these accessory systems throughout the entire flight envelope. Notably, however, such a configuration may reduce a responsiveness of the engine 10 by virtue of the additional loads and inertia on the core 32 of the engine 10. It will be appreciated that by coupling the accessory gearbox 66 and electric machine 68 to the low speed spool 45 of the engine 10, as opposed to the high speed spool 35, the gas turbine engine 10 may have a more responsive core 32. Moreover, while such may in turn result in a less responsive low speed system and rotor assembly 12, inclusion of the electric machine 68 may make up the responsiveness.

Referring still to FIG. 3, it will be appreciated that the electric machine 68 is coupled to the low speed spool 45 of the turbomachine 30 at a connection point 100 of the low speed spool 45. More specifically, for the embodiment shown, the accessory gearbox 66 is coupled to the low speed spool 45 at the connection point 100, and the electric machine 68 is coupled to the low speed spool 45 through the accessory gearbox 66. Moreover, for the embodiment shown, the turbomachine 30 includes a gear train 102 coupled to the low speed spool 45 at the connection point 100 and extending to the accessory gearbox 66. In such a manner, the accessory gearbox 66 may transfer rotational power from the low speed spool 45 of the engine 10 to, e.g., one or more accessory systems 70 mechanically coupled to the accessory gearbox 66 and the electric machine 68 rotatable with the accessory gearbox 66.

Further, as is depicted in FIG. 3, the exemplary gas turbine engine 10 includes an engine clutch 104 positioned in a torque path of the low speed spool 45 at a location forward of the connection point 100 of the low speed spool 45 (where the accessory gearbox 66 is coupled to the low speed spool 45 through the gear train 102). Specifically, for the embodiment shown, the engine clutch 104 is positioned in the torque path of the low speed spool 45 between the connection point 100 and the rotor assembly 12.

The engine clutch 104 may be moved between an engaged position, wherein torque may be transmitted across the engine clutch 104 along the low speed spool 45 to drive the rotor assembly 12 (or vice versa), and a disengaged position, wherein torque may not be transmitted across the engine clutch 104 along the low speed spool 45 to the rotor assembly 12. In such a manner, the engine clutch 104 may facilitate operation of the engine 10 without rotating the rotor assembly 12. Such may be beneficial, particularly during certain ground operations wherein it may be desirable to rotate the turbomachine 30 without creating thrust from the rotor assembly 12.

In at least certain exemplary aspects, the engine clutch 104 may be a two-stage clutch for transitioning from the disengaged position to the engaged position. As will be appreciated, when the engine clutch 104 is in the disengaged position, the low speed spool 45 may rotate freely relative to the rotor assembly 12. By contrast, when the engine clutch 104 is in the engaged position, the low speed spool 45 rotates with the rotor assembly 12. It will further be appreciated that such a configuration may allow for improved operations of the gas turbine engine 10. For example, such a configuration may allow for operation of the core 32 of the gas turbine engine 10 during, e.g., idle and post-landing operations, without engaging in rotating the rotor assembly 12. In such a manner, the electric machine 68 may be sized to accept 100% of a rated engine power, such that the gas turbine engine 10 may be operated at a rated engine power without engaging the rotor assembly 12 (i.e., by moving the engine clutch 104 to the engaged position) and having the electric machine 68 convert substantially all of such power to electrical energy to be provided to the aircraft incorporating the gas turbine engine 10 through an electric bus 120, to one or more energy storage units within or in electrical communication with the bus 120, to assist with starting additional engines, a combination thereof, etc. Subsequently, when it is desirable to produce thrust with the rotor assembly 12, the engine clutch 104 may be moved from a disengaged position to the transition position, slowly bringing the rotor assembly 12 up to speed before then moving the engine clutch 104 to the engaged position, rotationally locking the rotor assembly 12 to the low speed spool 45.

It will further be appreciated that, with the above configuration, the electric machine 68 may be utilized to accelerate the rotor assembly 12 more quickly during preflight operations once the engine clutch 104 is moved to the engaged position. More specifically, electrical power may be provided to the electric machine 68 and converted to rotational power provided through the accessory gearbox 66 to the low speed spool 45 to directly assist with accelerating the rotor assembly 12. Such may ensure the low speed spool 45 has a desired responsiveness despite the mounting of the accessory gearbox 66 to the low speed spool 45.

As will also be appreciated, in such a manner, the electric machine 68 may be used to start, or assist with starting, the engine 10. Referring still to the illustrated embodiment of FIG. 3, it will be appreciated that the exemplary engine 10 depicted further includes an inter-spool clutch 122 positioned between the low speed/low pressure system of the gas turbine engine 10 and the high speed/high pressure system of the gas turbine engine 10. Particularly, for the embodiment shown, the inter-spool clutch 122 is positioned between the low speed spool 45 and the high speed spool 35. The inter-spool clutch 122 may ensure that the low speed/low pressure system does not rotate faster than the high speed/high pressure system. The inter-spool clutch 122 may be, e.g., a one-way clutch, such as a sprag clutch. In such a manner, the electric machine 68 may be operable as the starter motor for the gas turbine engine 10. For example, during starting operations, the electric machine 68 may receive electrical power through an electric power bus 120 and convert such power to mechanical power transmitted through the accessory gearbox 66 and gear train 102 to the low speed spool 45, rotating the low speed spool 45. The inter-spool clutch 122 may be engaged by such rotation, such that the low speed spool 45 correspondingly rotates the high speed spool 35 across the inter-spool clutch 122. Once the gas turbine engine 10 has reached a light-off point such that a combustion section may be ignited to start generating combustion gasses to drive the high speed system, the high speed spool 35 may rotate more quickly than the low speed spool 45, and the inter-spool clutch 122 may be automatically disengaged, allowing for such a speed differential. In such a manner, the electric machine 68 may assist with starting the engine 10 by directly rotating the high speed spool 35, despite being coupled to the low speed spool 45.

Referring still to the embodiment of FIG. 3, once the aircraft including the gas turbine engine 10 has landed, the engine clutch 104 may be disengaged (i.e., moved to the disengaged position), such that the rotor assembly 12 may be immediately shut down after thrust is no longer needed from such engine 10. Such therefore allows for additional time for the gas turbine engine 10 to cool, allows for the gas turbine engine 10 to provide full electrical power on the ground without operating the rotor assembly 12 (and without producing significant thrust), may enable electric ground taxi, etc.

It will be appreciated, however, that in other exemplary embodiments the engine 10 may have any other suitable configuration. For example, the electric machine 68 may be coupled to the low speed spool 45 independently of the accessory gearbox 66 at an electric machine connection point, and the accessory gearbox 66 may coupled to the low speed spool 45 at a distinct low speed spool connection point. For example, the electric machine 68 may be coupled through an electric machine gear train and the accessory gearbox 66 may be coupled through a separate accessory gearbox gear train. Still, in further embodiments, such an electric machine 68 and/or accessory gearbox 66 may not be included. Still other configurations are contemplated as well.

Figure 4:
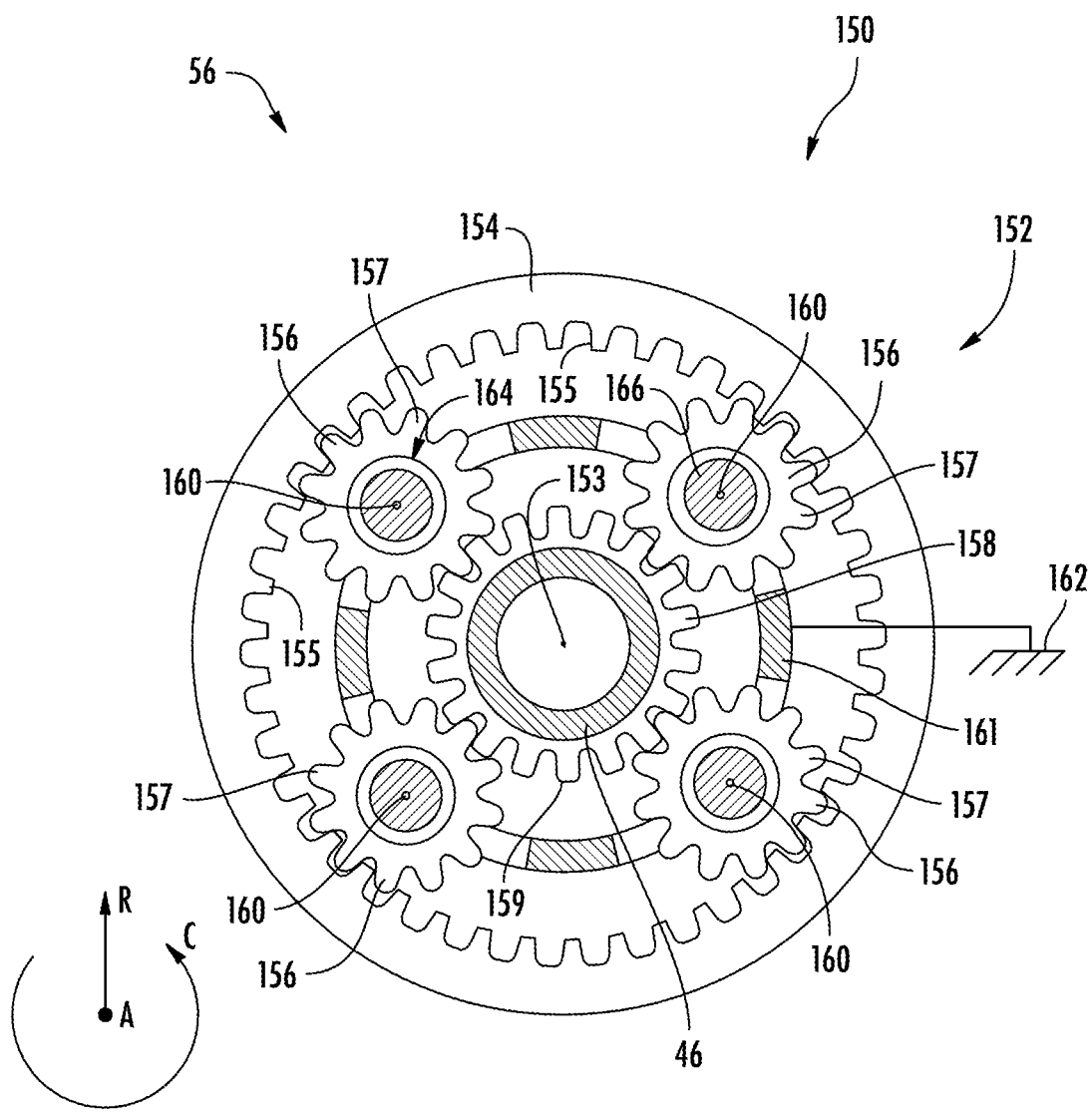
FIG. 4 is a schematic view of an epicyclic gearbox of a gas turbine engine in accordance with another exemplary aspect of the present disclosure.

Referring now to FIG. 4, a close-up, schematic view of an epicyclic gearbox assembly (gearbox 150) in accordance with an exemplary embodiment of the present disclosure is provided. The exemplary gearbox 150 is more specifically includes an epicyclic gear set 152. However, in other embodiments, the gearbox 150 may have any other suitable configuration. The embodiment of FIG. 4 will be described and is generally configured as a power gearbox, such as power gearbox 56 described above in reference to FIGS. 1 and 2. The gearbox 150 may be incorporated into the single, unducted rotor engine 10 described above with reference to FIGS. 1 and 2, or alternatively may be integrated into any other suitable gas turbine engine (e.g., a turboprop engine, a turbofan engine, another appropriate unducted engine, another appropriate ducted engine, etc.). As stated above, the rotor assembly 12 of the engine 10 includes the rotor blades 16 rotatable with the rotor assembly 12. Additionally, the low speed spool 45 includes the low speed shaft 46 rotatable with the low speed turbine 42. Moreover, the power gearbox 56 is mechanically coupled to both the rotor assembly 12 and the low speed shaft 46, such that the rotor assembly 12 is rotatable by the low speed shaft 46 across the power gearbox 56. However, it should be appreciated that the following description is equally applicable to any other gearbox of a suitable gas turbine engine, such as accessory gearbox 66 of engine 10 described above in reference to FIGS. 1-3.

For this embodiment, the epicyclic gear set 152 includes a ring gear 154, two or more planet gears 156, and a sun gear 158. The gearbox 150 defines a central axis 153, a radial direction R relative to the central axis 153, and a circumferential direction C extending about the central axis 153. For the embodiment shown, the central axis 153 may extend along the central longitudinal axis 14 of the engine 10 such that the radial direction R and circumferential direction C is the same as the radial direction R and circumferential direction C of the exemplary engine 10 of FIGS. 1-3. However, in other embodiments, the central axis 153 may be displaced from central longitudinal axis 14, e.g., such as in accessory gearbox 66, such that gearbox 150 defines its own local radial and circumferential directions.

For the depicted embodiment of FIG. 4, the sun gear 158 may be attached to and rotatable with the low speed shaft 46, such that the sun gear 158 is rotatable by the low pressure turbine 42 about the central axis 153 of the gearbox 150. Additionally, the ring gear 154 is, for the embodiment depicted, fixedly connected to the rotor assembly 12, such that the ring gear 154 rotates with the rotor assembly 12.

Additionally, for the embodiment depicted, the epicyclic gear set 152 includes the plurality of planet gears 156 engaged between the sun gear 158 and the ring gear 154. Specifically, for the embodiment depicted, the epicyclic gear set 152 includes four planet gears 156 engaged between the sun gear 158 and the ring gear 154. However, in other embodiments, the epicyclic gear set 152 may include any other suitable number of planet gears 156, such as three planet gears 156, five planet gears 156, six planet gears 156, etc. Each of the plurality of planet gears 156 are rotatable about a respective planet gear axis 160 and are rotatably attached to a planet gear carrier 161. For example, in the depicted embodiment, each planet gear 156 may define a central bore 164 configured to receive a corresponding layshaft 166 of the planet carrier 161. The planet carrier 161 may include a plurality of the layshafts 166 extending in an axial direction A of the gearbox 150 and received within central bores 164 of the corresponding number of planet gears 156 such that each planet gear 156 may rotate about its respective planet gear axis 160.

Additionally, the planet gear carrier 161 is, for the embodiment depicted, a fixed planet gear carrier 161 connected to a grounded structure 162 of the engine 10. For example, the planet gear carrier 161 may be attached to a gearbox assembly casing, a stationary frame of the engine 10, the cowl 48, or other suitable mounting structure of the engine 10. Moreover, each of the exemplary planet gears 156 are single gears (i.e., the epicyclic gear set 152 is configured as a single-stage gearbox). It should be appreciated, however, that in other embodiments, the one or more planet gears 156 may instead be configured as compound gears defining any suitable gear ratio. For example, the compound gear may include two or more geared portions rotating together on a common gearshaft and meshing with respective mating gears at different axial positions (such that, e.g., the epicyclic gear set 152 defines multiple "stages", as compared to the single-stage arrangement depicted).

During operation of the gearbox 150 configured as a power gearbox 56, a plurality of teeth 159 of the sun gear 158 mesh with a plurality of teeth 157 of the planet gears 156, such that rotation of the sun gear 158 and low pressure shaft 46 in turn rotates each of the plurality of planet gears 156 about their respective planet gear axes 160. The plurality of teeth 157 of the planet gears 156 also mesh with a plurality of teeth 155 of the ring gear 154, such that rotation of the planet gears 156 about their respective planet gear axes 160 in turn rotate the ring gear 154 and rotor assembly 12 about the engine axis 14.

It should be appreciated that the exemplary gearbox configuration of the gearbox 150 of FIG. 4, where the planet gears 156 and planet carrier 161 are held stationary in the circumferential direction C of epicyclic gear set 152, may be referred to as a star gearbox. More specifically, the gearbox of FIG. 4 is configured as a counter-rotating star gearbox such that the sun gear 158 and the ring gear 154 rotate in opposite directions relative to the circumferential direction C. However, in other embodiments, one of the ring gears 154 or the sun gear 158 may instead be held stationary, such that the gearbox 150 is instead configured as or referred to as a planetary gearbox or a differential gearbox, respectively. Further, in one or more embodiments, the gearbox 150 may be configured such that the low pressure shaft 46 and rotor assembly 12 rotate coaxially, or in the same circumferential direction C, relative to the longitudinal axis 14 of the engine 10.

Figure 5:
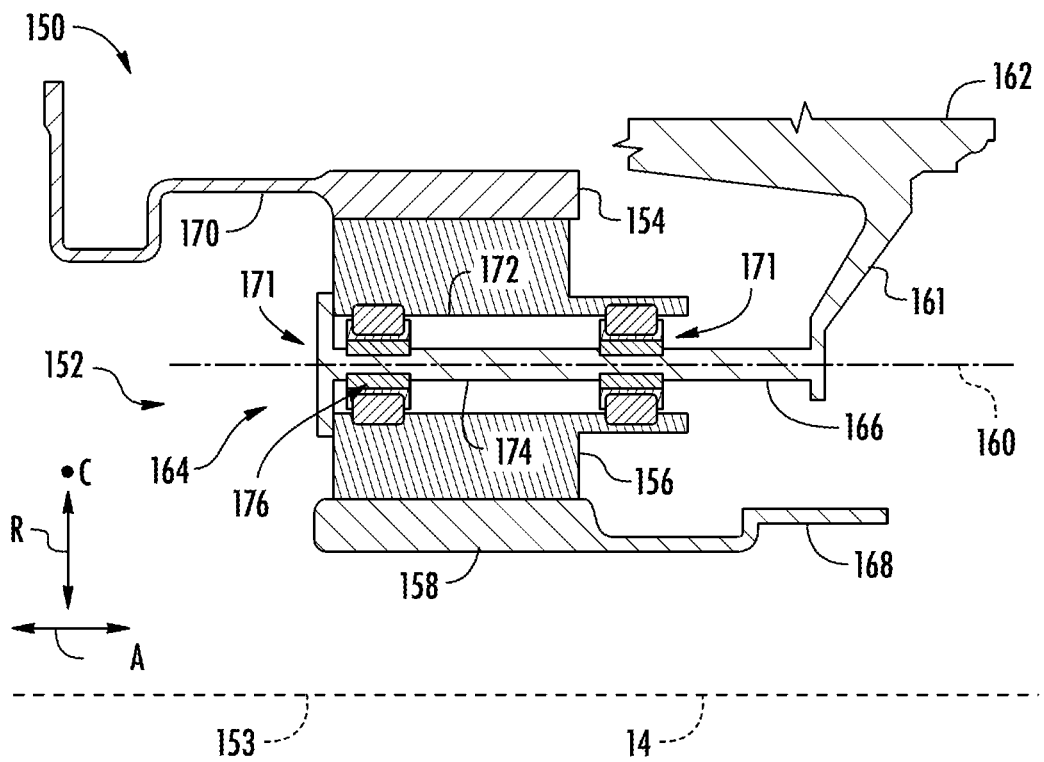
FIG. 5 is a schematic, cross-sectional view of an epicyclic gearbox for a gas turbine engine in accordance with another exemplary aspect of the present disclosure.

Referring now to FIG. 5, a schematic, cross-sectional view of a gearbox for a gas turbine engine in accordance with an exemplary embodiment of the present disclosure is provided. The exemplary, counter-rotating, star gearbox 150 may be incorporated into the exemplary engine 10 discussed above with reference to FIGS. 1-3 (e.g., as power gearbox 56), or alternatively, may be incorporated into any other suitable gas turbine engine (e.g., a differently configured unducted rotor engine, ducted rotor engine, a turbofan engine, a turboshaft engine, a turboprop engine, a turbojet engine, etc.), any other suitable combustion engine utilizing a gearbox, etc. The gearbox 150 will be described generally in relation to the power gearbox 56, but the following disclosure may be equally applicable to any other gearbox, e.g., accessory gearbox, utilizing any other suitable epicyclic gearbox configuration, e.g., a planetary gearbox configuration or a differential gearbox configuration.

Accordingly, the gearbox 150 may generally include a first attachment structure 168 coupled to the sun gear 158 and configured to be coupled to a first rotating component of the engine 10. For example, when the gearbox 150 is configured as the power gearbox 56, the first rotating component may be the low pressure shaft 46 of the low pressure spool 45. Thus, the first attachment structure 168 may be coupled between the sun gear 158 and at least one turbine 36, 42 of the engine 10. However, in other embodiments, the sun gear 158 may be directly coupled to a rotating shaft of the engine 10, such as low pressure shaft 46 or high pressure shaft 38. Further, the gearbox 150 may generally include a second attachment structure 170 coupled to the ring gear 154 and configured to be coupled to a second rotating component of the engine 10. For example, when the gearbox 150 is configured as the power gearbox 56, the second rotating component may be the rotor assembly 12. Thus, the second attachment structure 170 may be coupled between the ring gear 154 and the rotating blades 16 of the engine 10. However, in other embodiments, the ring gear 154 may be directly coupled to the rotor assembly 12. Alternatively, when incorporated into other engines or other gearboxes, the ring gear 154 and/or sun gear 158 may instead be configured to be coupled to any other rotating shafts or components of the engine.

As shown in FIG. 5, the planet carrier 161 may be coupled to or support the plurality planet gears 156 via the layshafts 166 of the planet carrier 161 (only one of each of the planet gears 156 and layshafts 166 illustrated in the embodiment of FIG. 5). As shown, the planet carrier 161 may be coupled to a grounded structure of 162 of the engine 10. For example, the planet carrier 161 may be coupled directly to the frame of the engine 10, the cowl 48 of the engine 10, a gearbox assembly casing, other suitable mounting structure of the engine 10. Thus, the planet carrier 161 may be coupled directly or indirectly to the frame of the engine 10 such that the planet carrier 161 supports the gearbox 150 relative to the engine 10. However, in other embodiments, the planet carrier 161 may be coupled to the attachment structure 170 or directly with the rotor assembly 12 such that the planet carrier 161 rotates about a central axis 153 of the gearbox 150 with the rotor assembly 12, while the sun gear 158 is coupled to the frame of the engine (a planetary gearbox configuration).

As illustrated in FIG. 5, the gearbox may also include one or more bearing assemblies 171, each corresponding to a layshaft 166 and planet gear 156 of each layshaft 166 and planet gear pair. Each bearing assembly 171 is generally configured to allow relative rotation of the corresponding planet gear 156 about the layshaft 166, e.g., about the planet gear axis 160. For instance, the bearing assembly 171 may be arranged between a central ring 172 defining the central bore 164 of a corresponding planet gear 156 and an exterior surface 174 of the corresponding layshaft 166. In the depicted embodiment, the bearing assembly(ies) 171 may include a thrust bearing including a plurality of ball bearings or a roller bearing including a plurality of roller element bearings. An exemplary bearing assembly 171 may include an inner race (not shown) coupled either directly or indirectly to the exterior surface 174 of the corresponding layshaft 166. Further, the exemplary bearing assembly 171 may include an outer race (not shown) coupled either directly or indirectly to the central ring 172 of the corresponding planet gear 156. The plurality of ball bearings or roller bearings (not shown) may be arranged between the inner and outer races circumferentially about the planet gear axis 160 to allow relative rotation of the inner and outer races (and thus the layshaft 166 and planet gear 156) about the planet gear axis 160. It should be appreciated, however, that in other embodiments, the bearing assembly(ies) 171 may instead have any other suitable form or configuration.

In order to provide damping or to reduce vibrations transferred to or through the gearbox 150 between various of the rotating and static structures associated with the gearbox 150, one or more shape memory alloy ("SMA") dampers may be provided in association with one or more of the sun gear 158, the ring gear 154, the planet gears 156, the planet carrier 161, the first attachment structure 168, or the second attachment structure 170. A SMA damper, as used herein, is a damper including at least one shape memory alloy material. Thus, the presently disclosed SMA dampers may reduce vibrations transferred to the gearbox 150 and/or may reduce vibrations transferred through the gearbox 150 to or from at least one of the frame of the engine 10, the first rotating component (e.g., the low pressure shaft 46), the second rotating component (e.g., the rotor assembly 12), or the planet carrier 161.

In some embodiments, the SMA damper(s) (such as one or more or all of SMA dampers) may include the SMA material as a major constituent, in an amount greater than 50 wt. % of the SMA damper. In certain embodiments, the SMA damper may be essentially composed of the SMA material. A SMA material is generally an alloy capable of returning to its original shape after being deformed. For instance, SMA materials may define a hysteresis effect where the loading path on a stress-strain graph is distinct from the unloading path on the stress-strain graph. Thus, SMA materials may provide improved hysteresis damping as compared to traditional elastic materials. Further, SMA materials may act as a lightweight, solid-state alternative to traditional actuators. For instance, certain SMA materials may be heated in order to return a deformed SMA to its pre-deformed shape. A SMA material may also provide varying stiffness, in a pre-determined manner, in response to certain ranges of temperatures. The change in stiffness of the shape memory alloy is due to a temperature related, solid state micro-structural phase change that enables the alloy to change from one physical shape to another physical shape. The changes in stiffness of the SMA material may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of a SMA damper intended to change stiffness during operation of the gearbox 150, the SMA damper may be formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase. Whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the SMA damper may define a first stiffness at a first temperature and define a second stiffness at a second temperature, wherein the second temperature is different from the first temperature. Further, in some embodiments, one of the first temperature or the second temperature is below the transition temperature and the other one may be at or above the transition temperature. Thus, in some embodiments, the first temperature may be below the transition temperature and the second temperature may be at or above the transition temperature. While in some other embodiments, the first temperature may be at or above the transition temperature and the second temperature may be below the transition temperature. Further, various of the SMA dampers described herein may be configured to have different first stiffnesses and different second stiffnesses at the same first and second temperatures.

Non-limiting examples of SMAs that may be suitable for forming various of the SMA dampers described herein may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA material may include a nickel-aluminum based alloys, copper-aluminum-nickel alloy, or alloys containing zinc, zirconium, copper, gold, platinum, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMA materials may also display superelasticity. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

It should be appreciated that the damping provided by various of the SMA dampers may be a combination of the damping provided by the SMA damper and other structure of the gearbox 150. For instance, the damping provided by the first attachment structure 168, the second attachment structure 170, the planetary carrier 161, other dampers (such as those associated with the bearing assembly(ies) 171, and/or any other components of gearbox 150 and/or associated with such gearbox) may be a combination of the damping provided by the SMA damper and any of the above recited elements associated with the gearbox 150.

Various of the SMA dampers disclosed herein may be in an unstressed state before assembly of the SMA damper within or in association with the gearbox 150. Moreover, after assembly or arrangement of the SMA damper(s) with respect to the gearbox 150, the SMA damper(s) may be in a pre-stressed state. For instance, the SMA damper(s) may be placed in compression in the pre-stressed state after assembly or arrangement with respect to the gearbox 150.

In some embodiments, an individual SMA damper or some or all of the SMA dampers may be in a pre-strained or pre-stressed condition (e.g., the pre-stressed state). The SMA damper(s) in the pre-stressed condition may shift the hysteresis cycle of the SMA damper(s) to a range of stresses that is different from that of a non-pre-stressed SMA damper (e.g., when the SMA damper is in the unstressed state). The pre-stressing further serves to maximize the damping function of the SMA damper(s) so that the material is active at the maximum stresses generated. More particularly, placing the SMA damper(s) in a pre-stress position or state may allow for dampers to enter a hysteretic bending regime without requiring a relatively large amount of displacement. For instance, in certain embodiments, the various SMA dampers disclosed herein may be pre-stressed between 70 GPa and 150 GPa. Further, it should be appreciated that, in embodiments including more than one SMA damper, the SMA dampers may be pre-stressed to the same or approximately the same stress or strain. However, additionally or alternatively, one or more SMA dampers may be pre-stressed or pre-strained at different degrees in order to provide an appropriate amount of damping for the position or conditions of the particular SMA damper.

In general, the exemplary embodiments of the gearbox 150, various components of or components associated with the gearbox 150, and/or the SMA damper(s), described herein, may be manufactured or formed using any suitable process. For instance, the SMA damper(s) or components thereof may be stamped or formed from laser electric discharge machining (EDM), milling, etc. However, in accordance with several aspects of the present subject matter, the SMA damper(s) may be formed using an additive-manufacturing process, such as a 3D printing process, or via casting. The use of such processes may allow the SMA damper(s) to be formed integrally and/or integrally with other components of or associated with the gearbox 150, as a single monolithic component, or as any suitable number of sub-components. Forming SMA damper(s) via additive manufacturing may allow for such damper(s) to be integrally formed and include a variety of features not possible when using prior manufacturing methods. For example, the additive manufacturing methods described herein may enable the manufacture of SMA damper(s) having any suitable size and shape with one or more configurations, some of these novel features are described herein.

Referring again to the exemplary gearbox 150 of FIG. 5, the gearbox 150 may include one or more SMA dampers provided in association with the planet carrier 161 such that vibrations transferred through the gearbox 150 are at least partially isolated from the frame of the engine 10. Additionally, or alternatively, such SMA damper(s) may at least partially isolate or reduce vibrations acting on the frame of the engine 10 transferred to the gearbox 150. For example, as shown in FIG. 5, one or more SMA dampers may be configured as bearing dampers 176 provided in association with one or more of the bearing assemblies 171 arranged between the planet gear(s) 156 and the corresponding layshaft(s) 166 of the planet carrier 161. In several embodiments, as described in more detail below with reference to FIGS. 6-11, the bearing damper(s) 176 may be arranged between the bearing assembly(ies) 171 and the exterior surface 174 of the corresponding layshaft(s) 166. Though described herein as arranged between the exterior surface(s) of 174 of the layshaft 166 and the associated bearing assembly 171, additionally, or alternatively, it should be appreciated that such description is equally application to one or more bearing damper(s) 176 arranged between the bearing assembly(ies) 171 and the central ring(s) 172 of the associated planet gear(s) 156.

Figure 6:
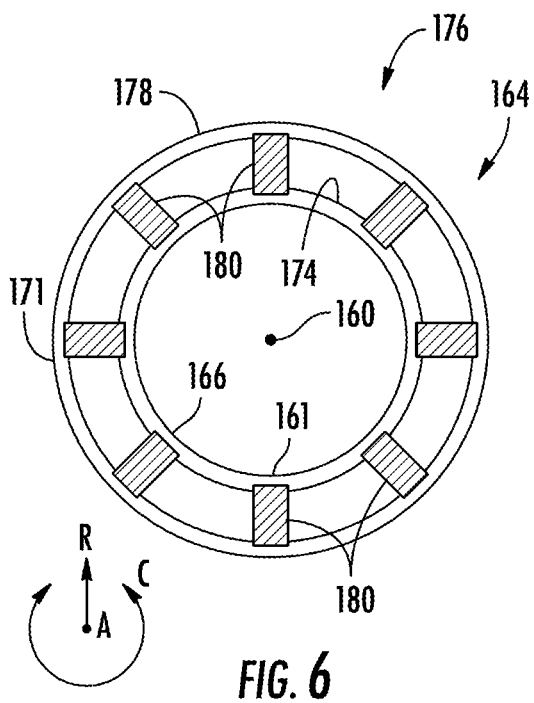
FIG. 6 is a bearing damper including a SMA material suitable for use in various gearboxes for a gas turbine engine in accordance with another exemplary aspect of the present disclosure.

Referring now to FIG. 6, one exemplary embodiment of a bearing damper including a SMA material suitable for use in various gearboxes, such as gearbox 150 described above with respect to FIG. 5, is illustrated in accordance with various aspects of the disclosure. In the depicted embodiment, the bearing damper 176 is positioned or arranged between the exterior surface 174 of a layshaft 166 and an inner race 178 of an associated bearing assembly 171 provided between the layshaft 166 and the central ring 172 of an associated planet gear 156. For example, the bearing damper 176 may generally be arranged or placed within the central bore 164 as described above with respect to FIG. 5 or within a bore or central opening or cavity of any suitable gear utilized within a gearbox and rotationally supported by a layshaft or similar and in association with a suitable bearing assembly.

The depicted bearing damper 176 may include two or more SMA members 180 arranged between the exterior surface 174 of the layshaft 166 of the planet carrier 161 and the inner race 178 of the associated bearing assembly 171. In one embodiment, the SMA members 180 may extend along or approximately along the radial direction R with respect to the corresponding planet gear axis 160. Additionally, or alternatively, the one or more of the SMA members 180 may also extend along the circumferential and/or axial directions C, A with respect to the planet gear axis 160 such that the SMA member(s) 180 define an angle with respect to the radial direction R. The SMA members 180 may each generally be configured as a cylinder or cylindrically shaped body. However, in additional or alternative embodiments, one or more SMA members 180 may define any suitable cross-sectional shape, such as, but not limited to, box or rectangular shaped, elliptically shaped, any other polygon or section of a polygon defining any number of sides, any other suitable shape, or a combination of one or more of the preceding. Further, it should be appreciated that each SMA member 180 of a corresponding bearing damper 176 need not define the same cross-sectional shape, and SMA members 180 between two distinct bearing dampers 176 may include distinct cross-sectional shapes or combinations of shapes. Moreover, the SMA members 180 may be secured via a friction fit or coupled to one or both of the exterior surface 174 of the layshaft 166 or the inner race 178 of the associated bearing assembly 171 via fastening (bolts, nuts, rivets, etc.), adhesion, welding, or any other suitable means. In various embodiments, the one or more of the SMA members 180 may be formed integrally with one or both of the exterior surface 174 of the layshaft 166 or the inner race 178 of the associated bearing assembly 171.

Figure 7:
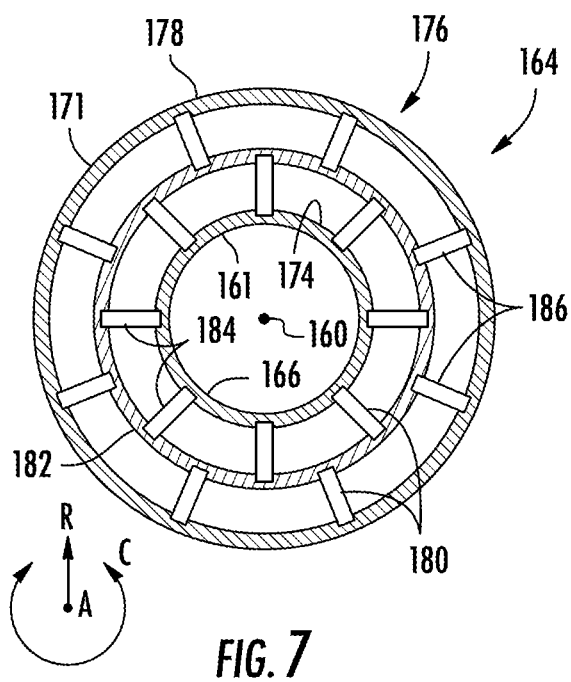
FIG. 7 is an additional or alternative bearing damper including a SMA material suitable for use in various gearboxes for a gas turbine engine in accordance with another exemplary aspect of the present disclosure.

Referring now to FIG. 7, one exemplary embodiment of an additional or alternative bearing damper including a SMA material suitable for use in various gearboxes, such as gearbox 150 described above with respect to FIG. 5, is illustrated in accordance with various aspects of the disclosure. The bearing damper 176 of FIG. 7 may generally be configured similar to the bearing damper described above with respect to FIG. 6. For instance, the bearing damper 176 may be positioned or arranged between the exterior surface 174 of a layshaft 166 and an inner race 178 of an associated bearing assembly 171 provided between the layshaft 166 and the central ring 172 of an associated planet gear 156. However, for the depicted embodiment of FIG. 7, the bearing damper 176 may additionally include a SMA ring 182 arranged within the central bore 164 between the exterior surface 174 of the corresponding layshaft 166 of the planet carrier 161 and the associated bearing assembly 171, such as between the exterior surface 174 and the inner race 178 of the bearing assembly 171. In the depicted embodiment, the SMA ring 182 circumscribes the layshaft 166 and thus extends generally along the circumferential direction C relative to the planet gear axis 160 such that the SMA ring 182 is arranged within the central bore 164 of the planet gear 156. Thus, the SMA ring 182 may provide improved damping between a corresponding layshaft 166 and planet gear 156 pair.

The bearing damper 176 of FIG. 7 may generally include SMA members 180 configured the same as or similar to the SMA members 180 described above with respect to the depicted embodiment of FIG. 6. For instance, the depicted bearing damper 176 may include first SMA members 184 extending radially relative to the planet gear axis 160 between the exterior surface 174 of the layshaft 166 and the SMA ring 182. Similarly, the depicted bearing damper 176 may include second SMA members 186 extending radially relative to the planet gear axis 160 between the SMA ring 182 and the inner race 178 of the bearing assembly 171. It should be appreciated that one or more of the first and/or second SMA member 184, 186 may be secured via friction fit or formed integrally with or coupled to the SMA ring 182 via fastening (bolts, nuts, rivets, etc.), adhesion, welding, or any other suitable means. Additionally, or alternatively, it should be appreciated that one or more bearing dampers 176 need not include both of the first and second SMA members

184, 186. For instance, the SMA ring 182 may be arranged in contact with one of the exterior surface 174 of the layshaft 166 or the inner race 178 of the bearing assembly 171. In such an embodiment, the SMA ring 182 may be secured to the respective exterior surface 174 or the inner race 178 via friction fit or formed integrally with or coupled thereto via fastening (bolts, nuts, rivets, etc.), adhesion, welding, or any other suitable means.

Figure 8:
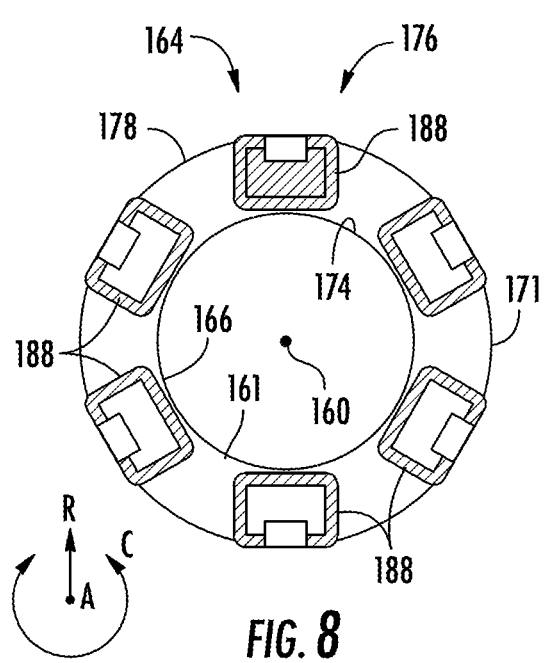
FIG. 8 is an additional or alternative bearing damper including a SMA material suitable for use in various gearboxes for a gas turbine engine in accordance with another exemplary aspect of the present disclosure.

Referring now to FIG. 8, one exemplary embodiment of an additional or alternative bearing damper including a SMA material suitable for use in various gearboxes, such as gearbox 150 described above with respect to FIG. 5, is illustrated in accordance with various aspects of the disclosure. The bearing damper 176 of FIG. 8 may generally be configured similar to the bearing dampers described above with respect to FIGS. 6 and 7. For instance, the bearing damper 176 may be positioned or arranged between the exterior surface 174 of a layshaft 166 and an inner race 178 of an associated bearing assembly 171 provided between the layshaft 166 and the central ring 172 of an associated planet gear 156. However, for the depicted embodiment of FIG. 8, the bearing damper 176 may include a plurality of closed SMA elements 188.

The closed SMA element(s) 188 described herein generally refers to a damping element defining a shape that is close in a plane perpendicular to the axial direction A with respect to the planet gear axis 160. For instance, as shown in the exemplary embodiment of FIG. 8, the closed SMA element 188 may define a box or rectangular shape in a plane defined along the radial and circumferential directions R, C. However, in additional or alternative embodiments, one or more closed SMA elements 188 may define any suitable cross-sectional shape, e.g., circular, elliptical, any other polygon or section of a polygon defining any number of sides, or a combination of one or more of the preceding. In the depicted embodiment, the closed SMA elements 188 are fixed to the inner race 178 of the bearing assembly 171 and are friction fit to the exterior surface 174 of the layshaft 166. The closed SMA elements 188 may be fixed the same as or similar to the SMA members 180 described above with respect to FIGS. 6 and 7. In additional or alternative embodiments, one or more of the SMA elements 188 may be friction fit to both the exterior surface 174 and the inner race 178. Still, in additional or alternative embodiments, one or more of the closed SMA elements 188 may be fixed to both the exterior surface 174 and the inner race 178.

Figure 9:
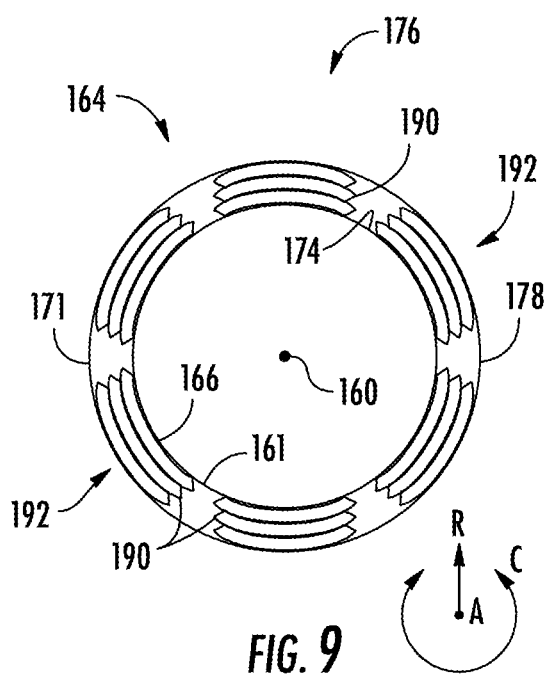
FIG. 9 is an additional or alternative bearing damper including a SMA material suitable for use in various gearboxes for a gas turbine engine in accordance with another exemplary aspect of the present disclosure.

Referring now to FIG. 9, one exemplary embodiment of an additional or alternative bearing damper including a SMA material suitable for use in various gearboxes, such as gearbox 150 described above with respect to FIG. 5, is illustrated in accordance with various aspects of the disclosure. The bearing damper 176 of FIG. 9 may generally be configured similar to the bearing dampers described above with respect to FIGS. 6-8. For instance, the bearing damper 176 may be positioned or arranged between the exterior surface 174 of a layshaft 166 and an inner race 178 of an associated bearing assembly 171 provided between the layshaft 166 and the central ring 172 of an associated planet gear 156. However, for the depicted embodiment of FIG. 9, the bearing damper 176 may include a plurality of SMA plates 190, such as corrugated SMA plates. For example, as shown, the depicted bearing damper 176 of FIG. 9 may include the plurality of SMA plates 190 stacked in the radial direction R with respect to the planet gear axis 160 between the exterior surface 174 of the corresponding layshaft 166 and the inner race 178 of the corresponding bearing assembly 171. Thus, the SMA plates 190 may extend in the circumferential direction C with respect to the central bore 164 and the planet gear axis 160 of the associated planet gear 156.

In the depicted embodiment of FIG. 9, the bearing damper 176 may include two or more sets 192 of the SMA plates 190 arranged at multiple location in the space between the exterior surface 174 of the layshaft 166 and the inner race 178 of the associated bearing assembly 171. Thus, the sets 192 of the SMA plates 190 may circumferential inscribe the exterior surface 174 of the corresponding layshaft 166 within the central bore 164 of the associated planet gear 156. However, in additional or alternative embodiments, one or more of the SMA plates 190 may generally extending along and fully circumscribe the exterior surface 174 of the layshaft 166. For instance, at least one of the SMA plates 190, such as all of the SMA plates 190, may extend fully along the circumferential direction C to form rings. Though described generally as corrugated plates, in one example, it should be appreciated that the SMA plates 190 may define any suitable shape or cross-sectional shape. For instance, in an additional or alternative embodiment, at least one of the SMA plates 190 may be configured as a leaf spring(s). Further, one or more of the SMA plates 190 may be configured to curve radially inward or radially outward at respective ends of the SMA plate(s) 190 with respect to the planet gear axis 160. The SMA plates 190 may be secured, coupled, or fixed within the central bore 164 the same as or similar to the SMA members 180 described above with respect to FIGS. 6 and 7 and/or the SMA elements 188 described above with respect to FIG. 8.

Figure 10:
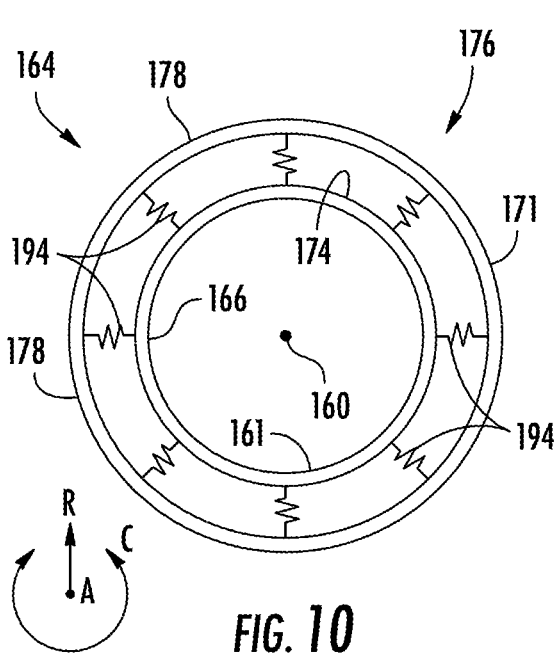
FIG. 10 is an additional or alternative bearing damper including a SMA material suitable for use in various gearboxes for a gas turbine engine in accordance with another exemplary aspect of the present disclosure.

Referring now to FIG. 10, one exemplary embodiment of an additional or alternative bearing damper including a SMA material suitable for use in various gearboxes, such as gearbox 150 described above with respect to FIG. 5, is illustrated in accordance with various aspects of the disclosure. The bearing damper 176 of FIG. 10 may generally be configured similar to the bearing dampers described above with respect to FIGS. 6-9. For instance, the bearing damper 176 may be positioned or arranged between the exterior surface 174 of a layshaft 166 and an inner race 178 of an associated bearing assembly 171 provided between the layshaft 166 and the central ring 172 of an associated planet gear 156. However, for the depicted embodiment of FIG. 9, the bearing damper 176 may include a plurality of SMA springs 194. For instance, as shown, the bearing assembly 171 may include two or more SMA springs 194 arranged between the exterior surface 174 of the layshaft 166 of the planet carrier 161 and the inner race 178 of the associated bearing assembly 171. In one embodiment, the SMA springs 194 may extend along or approximately along the radial direction R with respect to the corresponding planet gear axis 160. The SMA springs 194 may be secured, coupled, or fixed within the central bore 164 the same as or similar to the SMA members 180 described above with respect to FIGS. 6 and 7, the SMA elements 188 described above with respect to FIG. 8, and/or the SMA plates 190 described above with respect to FIG. 9.

Figure 11:
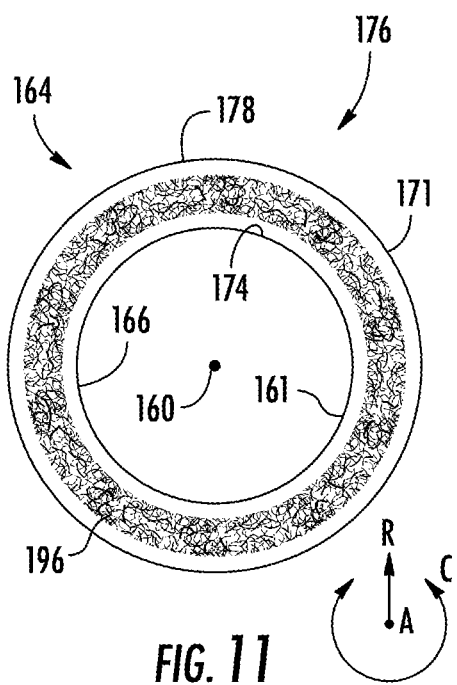
FIG. 11 is an additional or alternative bearing damper including a SMA material suitable for use in various gearboxes for a gas turbine engine in accordance with another exemplary aspect of the present disclosure.

Referring now to FIG. 11, one exemplary embodiment of an additional or alternative bearing damper including a SMA material suitable for use in various gearboxes, such as gearbox 150 described above with respect to FIG. 5, is illustrated in accordance with various aspects of the disclosure. The bearing damper 176 of FIG. 11 may generally be configured similar to the bearing dampers described above with respect to FIGS. 6-10. For instance, the bearing damper 176 may be positioned or arranged between the exterior surface 174 of a layshaft 166 and an inner race 178 of an associated bearing assembly 171 provided between the layshaft 166 and the central ring 172 of an associated planet gear 156. However, for the depicted embodiment of FIG. 10, the bearing damper 176 may include a SMA mesh ring 196 arranged between the exterior surface 174 of the layshaft 166 of the planet carrier 161 and the inner race 178 of the associated bearing assembly 171 within the central bore 164. In the depicted embodiment, the SMA mesh ring 196 circumscribes the layshaft 166 and thus extends generally along the circumferential direction C relative to the planet gear axis 160 such that the SMA mesh ring 196 is arranged within the central bore 164 of the planet gear 156. It should be appreciated that the SMA mesh ring 196 may be continuous along the circumferential direction C or may be segmented such that the SMA mesh ring 196 includes two or more mesh segments arranged end to end with respect to the circumferential direction C in order to circumscribe the exterior surface 174 of the corresponding layshaft 166. The SMA mesh ring 196 may be secured, coupled, or fixed within the central bore 164 the same as or similar to the SMA members 180 described above with respect to FIGS. 6 and 7, the SMA elements 188 described above with respect to FIG. 8, the SMA plates 190 described above with respect to FIG. 9, and/or the SMA springs 194 described above with respect to FIG. 10. Additionally, or alternatively, the SMA mesh ring 196 may be formed integrally with one or both of the exterior surface 174 of the layshaft 166 or the inner race 178.

Figure 12:
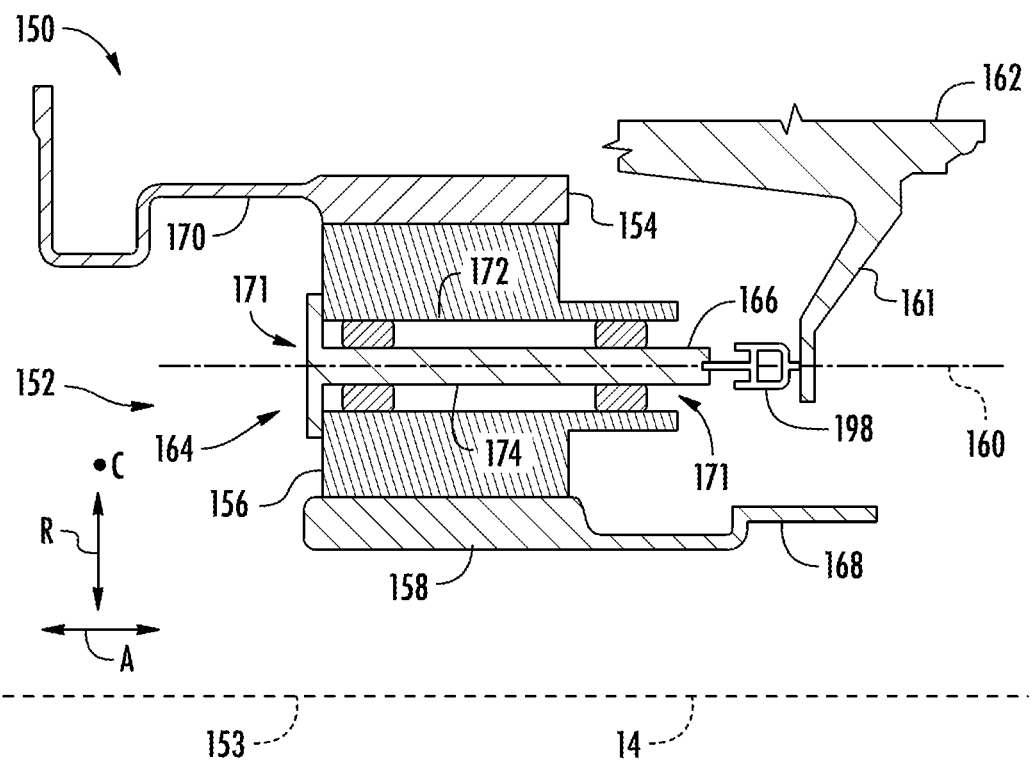
FIG. 12 is a schematic, cross-sectional view of an additional or alternative gearbox for a gas turbine engine in accordance with another exemplary aspect of the present disclosure.

Referring now to FIG. 12, an exemplary embodiment of an additional or alternative gearbox for a gas turbine engine in accordance with aspects of the present disclosure is provided. The gearbox 150 of FIG. 12 may generally be configured similar to the gearbox described above with respect to FIGS. 4 and 5. For instance, the gearbox 150 may be configured as a counter-rotating, star gearbox 150 and may be incorporated into the exemplary engine 10 discussed above with reference to FIGS. 1-3 (e.g., as power gearbox 56), or alternatively, may be incorporated into any other suitable gas turbine engine (e.g., a differently configured unducted rotor engine, ducted rotor engine, a turbofan engine, a turboshaft engine, a turboprop engine, a turbojet engine, etc.), or any other suitable combustion engine utilizing a gearbox, etc. The gearbox 150 will be described generally in relation to the power gearbox 56, but the following disclosure may be equally applicable to any other gearbox, e.g., an accessory gearbox 66, utilizing any other suitable epicyclic gearbox configuration, e.g., a planetary gearbox configuration or a differential gearbox configuration. The gearbox 150 may generally include a first attachment structure 168, a sun gear 158, a second attachment structure 170, a ring gear 154, a plurality of planet gears 156 arranged between the sun gear 158 and the ring gear 154, a planet carrier 161 including layshafts 166, and one or more bearing assemblies 171. However, for the depicted embodiment of FIG. 12, the gearbox 150 may include a SMA isolating damper 198 coupled to the planet carrier 161 between the planet carrier 161 and the frame and/or grounded structure 162 of the engine 10.

Such a SMA isolating damper 198 may at least partially isolate the planet carrier 161 and vibrations transferred through the planet carrier 161 from the frame of the engine 10. Additionally, or alternatively, such SMA isolating damper 198 may at least partially isolate or reduce vibrations acting on the frame of the engine 10 transferred to the gearbox 150. For the exemplary embodiment of FIG. 12, the SMA isolating damper 198 is arranged between segments of the planet carrier 161 in order to dampen vibrations transferred between the frame of the engine 10 and the gearbox 150. For example, as shown, the SMA isolating damper 198 is depicted as placed between the layshaft 166 of the planet carrier 161 and the remaining structure of the planet carrier 161. However, in other embodiments, the SMA isolating damper 198 may be arranged between any suitable sections or parts of the planet carrier 161 and/or between the planet carrier 161 and the grounded structure 162 or frame of the engine 10.

The SMA isolating damper 198 may generally be configured as a segment of the planet carrier 161 or another type of damper such as a shock or similar structure known to those having ordinary skill in the art formed from a SMA material as described herein. Furthermore, the SMA isolating damper 198 may be secured between segments of the planet carrier 161 or between the planet carrier 161 and the grounded structure 162 or frame utilizing one or more of fastening (bolts, nuts, rivets, etc.), adhesion, welding, or any other suitable means. Additionally, or alternatively, the SMA isolating damper 198 may be formed integrally with one or more segments of the planet carrier 161, the grounded structure 162 of the engine 10, and/or the frame of the engine 10. Though described in relation to a planet carrier 161 fixed to a grounded structure 162 or frame of the engine 10, it should be appreciated that such SMA isolating damper 198 is equally applicable in an embodiment of a gearbox where the planet carrier 161 is coupled to a rotating component of the engine 10. Additionally, the gearbox 150 may generally include SMA isolating dampers 198 in association with multiple, such as all, of the layshafts 166 of the planet carrier 161.

Figure 13:
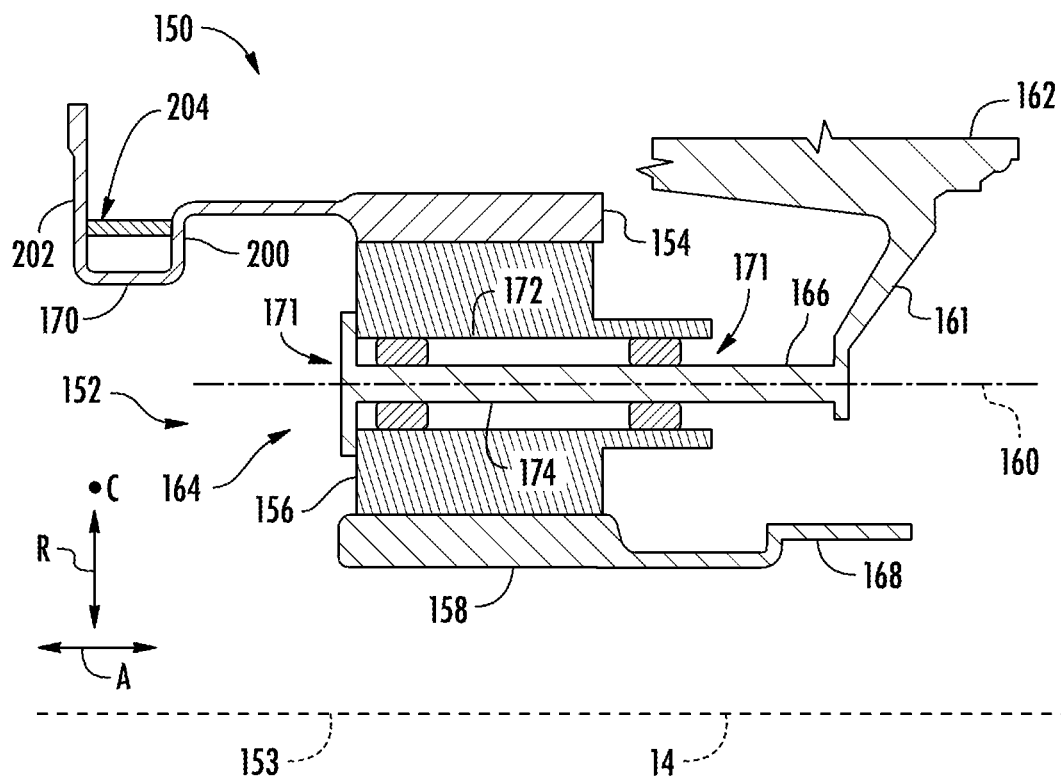
FIG. 13 is a schematic, cross-sectional view of an additional or alternative gearbox for a gas turbine engine in accordance with another exemplary aspect of the present disclosure.

Referring now to FIG. 13, an exemplary embodiment of an additional or alternative gearbox for a gas turbine engine in accordance with aspects of present disclosure is provided. The gearbox 150 of FIG. 13 may generally be configured similar to the gearboxes described above with respect to FIGS. 4, 5, and 12. For instance, the gearbox 150 may be configured as a counter-rotating, star gearbox 150 and may be incorporated into the exemplary engine 10 discussed above with reference to FIGS. 1-3 (e.g., as power gearbox 56), or alternatively, may be incorporated into any other suitable gas turbine engine (e.g., a differently configured unducted rotor engine, ducted rotor engine, a turbofan engine, a turboshaft engine, a turboprop engine, a turbojet engine, etc.), or any other suitable combustion engine utilizing a gearbox, etc. The gearbox 150 will be described generally in relation to the power gearbox 56, but the following disclosure may be equally applicable to any other gearbox, e.g., an accessory gearbox 66, utilizing any other suitable epicyclic gearbox configuration, e.g., a planetary gearbox configuration or a differential gearbox configuration.

The gearbox 150 may generally include a first attachment structure 168, a sun gear 158, a second attachment structure 170, a ring gear 154, a plurality of planet gears 156 arranged between the sun gear 158 and the ring gear 154, a planet carrier 161 including layshafts 166, and one or more bearing assemblies 171. However, for the depicted embodiment of FIG. 13, the gearbox 150 may include a SMA extension damper 204 provided in association with one or both of the first attachment structure 168 or the second attachment structure 170 (not shown). Thus, though the following embodiment is described in relation to the second attachment structure 170, it should be appreciated that such a SMA extension damper 204 is equally suitable for use with the first attachment structure 168. Further, though described in relation to an attachment structure coupled to a rotating component of the engine 10, it should be appreciated such SMA extension damper 204 may be equally applicable to an attachment structure configured to be coupled to a grounded structure 162 or frame of the engine 10.

In the exemplary embodiment of FIG. 13, the second attachment structure 170 includes a first segment 200 coupled to or formed integrally with the sun gear 158. Additionally, the second attachment structure 170 may include a second segment 202 configured to be coupled to a rotating component of the engine 10, e.g., the rotor assembly 12 of the engine 10. The first and second segments 200, 202 may be integrally formed together or may be coupled together. Furthermore, at least a portion of the first segment 200 and at least a portion of the second segment 202 of the second attachment structure 170 may extend parallel or at least partially parallel to one another. Further, the such parallel extending portions may be displaced from one another in a direction perpendicular to such parallel extending or partially extending portions. Thus, for example, the depicted second attachment structure 170 may define an approximately U-shaped cross-section defined by the first and second segments 200, 202 of the second attachment structure 170. Such an arrangement may result in a flexible second attachment structure 170 that provides a degree of damping between the ring gear 154 and the rotating structure coupled to the attachment structure 170. However, in additional or alternative embodiments, it should be appreciated that the second attachment structure 170 including the first and second segments 200, 202 may define any suitable arrangement or shape in order to provide a degree of damping to the ring gear 154. However, in certain embodiments of the gearbox 150 and/or in certain operating conditions of the gearbox 150, the damping provided by such flexible attachment structure 170 may not be sufficient to reduce vibrations transferred between the ring gear 154 and the rotating component of the engine 10.

Therefore, as depicted in the exemplary embodiment of FIG. 13, the gearbox 150 may include the SMA extension damper 204 provided in association with the second attachment structure 170 in order to provide improved damping between the ring gear 154 and a corresponding rotating component of the engine 10. Thus, various embodiments of the SMA extension damper 204 may further reduce vibrations transferred between the ring gear 154 of the gearbox 150 and an associated rotating component of the engine 10 compared to a flexible second attachment structure 170 alone. In general, the SMA extension damper 204 may be coupled between the first segment 200 and the second segment 202 of the second attachment structure 170 in order to increase the damping provided. For instance, the SMA extension damper 204 may extend at least partially perpendicular to one or both of the first and second segments 200, 202. As one example, as shown in FIG. 13, the SMA extension damper 204 may extend between the first segment 200 and the second segment 202 within the U-shape of such a second attachment structure 170. Furthermore, the SMA extension damper 204 may be secured between the segments 200, 202 of the second attachment structure 170 utilizing one or more of fastening (bolts, nuts, rivets, etc.), adhesion, welding, or any other suitable means. Additionally, or alternatively, the SMA extension damper 204 may be formed integrally with one or both segments 200, 202 of the second attachment structure 170.

Figure 14:
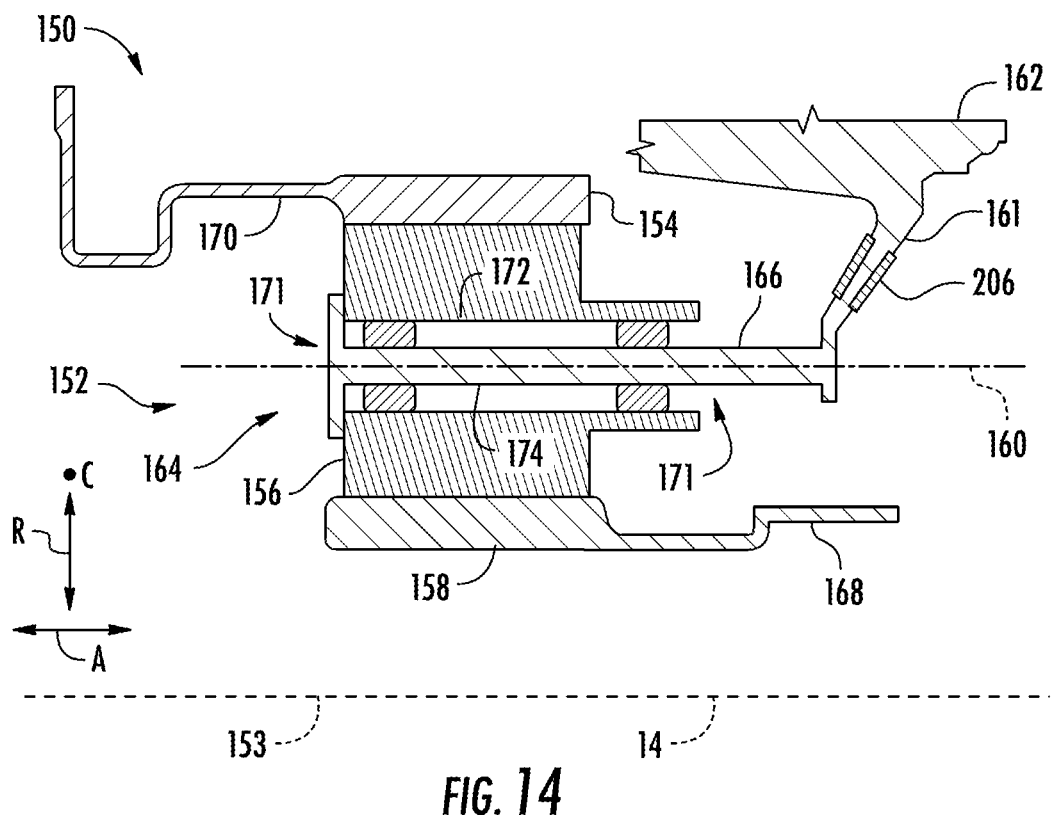
FIG. 14 is a schematic, cross-sectional view of an additional or alternative gearbox for a gas turbine engine in accordance with another exemplary aspect of the present disclosure.

Referring now to FIG. 14, an exemplary embodiment of an additional or alternative gearbox for a gas turbine engine in accordance with aspects of present disclosure is provided. The gearbox 150 of FIG. 14 may generally be configured similar to the gearboxes described above with respect to FIGS. 4, 5, 12, and 13. For instance, the gearbox 150 may be configured as a counter-rotating, star gearbox 150 and may be incorporated into the exemplary engine 10 discussed above with reference to FIGS. 1-3 (e.g., as power gearbox 56), or alternatively, may be incorporated into any other suitable gas turbine engine (e.g., a differently configured unducted rotor engine, ducted rotor engine, a turbofan engine, a turboshaft engine, a turboprop engine, a turbojet engine, etc.), or any other suitable combustion engine utilizing a gearbox, etc. The gearbox 150 will be described generally in relation to the power gearbox 56, but the following disclosure may be equally applicable to any other gearbox, e.g., an accessory gearbox 66, utilizing any other suitable epicyclic gearbox configuration, e.g., a planetary gearbox configuration or a differential gearbox configuration.

The gearbox 150 may generally include a first attachment structure 168, a sun gear 158, a second attachment structure 170, a ring gear 154, a plurality of planet gears 156 arranged between the sun gear 158 and the ring gear 154, a planet carrier 161 including layshafts 166, and one or more bearing assemblies 171. However, for the depicted embodiment of FIG. 14, the gearbox 150 may include a SMA exterior damper 206 provided in association with the planet carrier 161. However, though the following embodiment is described in relation to the planet carrier 161, it should be appreciated that such a SMA exterior damper 206 is equally suitable for use with the first and/or second attachment structures 168, 170. Further, though described in relation to a planet carrier 161 coupled to a static structure of the engine 10, it should be appreciated such SMA exterior damper 206 may be equally applicable to a planet carrier 161 configured to be coupled to a rotating structure of the engine 10, e.g., the rotor assembly 12.

In the exemplary embodiment of FIG. 14, the SMA exterior damper 206 may be fixed or coupled to an exterior surface of the planet carrier 161 in order to provide improved damping between the planet gears(s) 156 and the frame and/or a grounded structure 162 of the engine 10. Thus, various embodiments of the SMA exterior damper 206 may further reduce vibrations transferred between the planet gears 156 of the gearbox 150 and the frame of the engine 10 compared to a planet carrier 161 alone. In general, the SMA exterior damper 206 may be positioned on such exterior surface between the layshaft(s) 166 of the planet carrier 161 and the grounded structure 162 in order to increase the provided damping. For example, the SMA exterior damper 206 may be positioned on a portion of the planet carrier 161, as shown in FIG. 171. However, in alternative embodiments, the SMA exterior damper 206 may be positioned on all of the external surface of the planet carrier 161 between the layshaft(s) 166 and the grounded structure 162 of the engine 10. Additionally, or alternatively, the SMA exterior damper 206 may also be applied to the exterior surface 174 of one or more of the layshafts 166 of the planet carrier 161. In general, the SMA exterior damper 206 may include one or more strips, sheets, segments, or the like secured to the planet carrier 161 utilizing one or more of fastening (bolts, nuts, rivets, etc.), adhesion, welding, or any other suitable means. Additionally, or alternatively, the SMA exterior damper 206 may be formed integrally with planet carrier 161. In at least one embodiment, a portion or all of the SMA exterior damper 206 may include a spray on coating applied to at least a segment of the exterior surface of the planet carrier 161. Furthermore, as described in more detail with respect to FIG. 15 below, the SMA exterior damper 206 may be cryogenically fit onto the exterior surface of the planet carrier 161.

Figure 15:
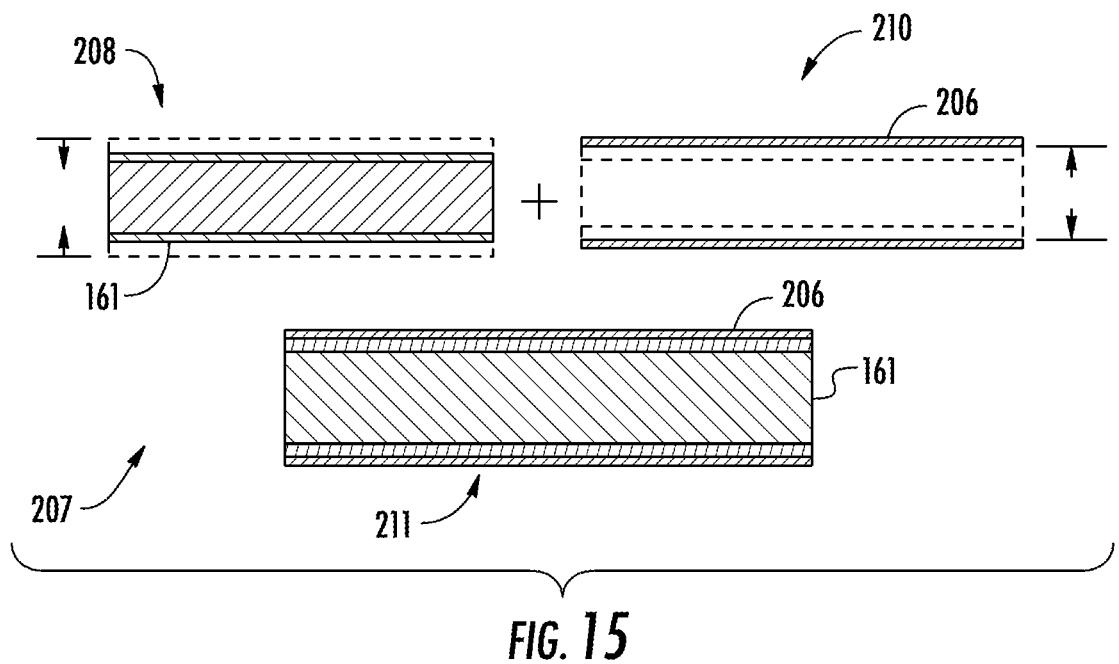
FIG. 15 is a schematic, cross-sectional view of a SMA exterior damper cryogenically fit on a planet carrier of a gearbox in accordance with another exemplary aspect of the present disclosure.

Referring now to FIG. 15, one embodiment of the SMA exterior damper 206 of FIG. 14 being cryogenically fit onto the exterior surface of the planet carrier 161 in a cryogenic fit process 207 is illustrated in accordance with aspects of the present subject matter. Cryogenically fit, as used herein, may also be referred to as shrink fit, compression fit, and generally corresponds to a specialized friction fit process utilizing the expanding and/or contracting nature of exterior and interior components to provide a more robust friction fit between such components. In practice, the internal component may be cooled, such as via exposure to a cryogen, carbon dioxide, liquid nitrogen, or the like, in order to reduce the size of the internal component from the contraction of such internal component associated with the cooling process. Additional, or alternatively, an external component may be heated in order to enlarge the external component from the expansion of such external component associated with the heating process. After such cooling and/or heating, the internal component may be inserted within the external component. Subsequently, the internal component and/or external component are allowed to heat up or cool down, respectively, in order to provide an increased friction fit between the components.

As shown in the exemplary process 207 of FIG. 15, in a first step (208) of the cryogenic fit process 207, the planet carrier 161 may be cooled in order to reduce the size of the planet carrier 161. In a second step (210), the SMA exterior damper 206 may be heated in order to increase the size of the SMA exterior damper 206. In such an embodiment, the SMA exterior damper 206 may be configured as a tube or sheath. However, it should be appreciated that such cryogenic fit process 207 need only include one of step 208, 210. In a third step (211), the planet carrier 161 is inserted within the SMA exterior damper 206. Third step 211 further includes at least one of allowing the planet carrier 161 to warm, expanding the planet carrier 161, or allowing the SMA exterior damper 206 to cool, shrinking the SMA exterior damper 206. Thus, the cryogenic fit process 207 may provide a more robust friction fit between the SMA exterior damper 206 and the planet carrier 161. Furthermore, it should be appreciated that such a cryogenic fit process 207 may also prestress the SMA exterior damper 206 as described herein.

Figure 16:
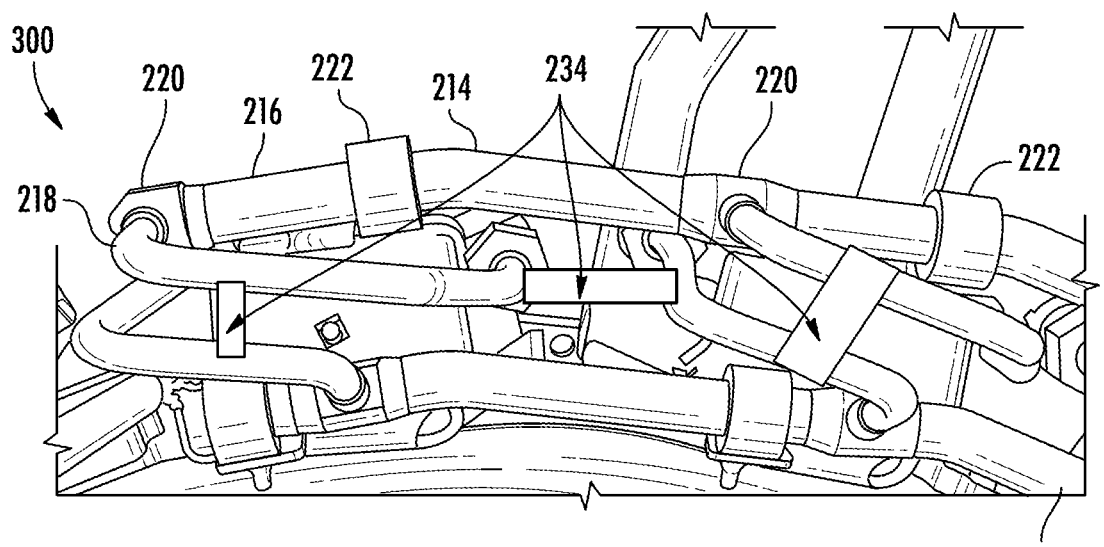
FIG. 16 is a pictorial, schematic view of a fluid transfer system of a gas turbine engine in accordance with another exemplary aspect of the present disclosure.

Embodiments of the present disclosure are also related the use of SMA dampers in association with a fluid transfer system provided in association with a gas turbine engine. Referring now to FIG. 16, an exemplary fluid transfer system for a gas turbine engine in accordance with an exemplary embodiment of the present disclosure is provided. The exemplary fluid transfer system 300 may be incorporated into the exemplary engine 10 discussed above with reference to FIG. 1-3, or alternatively, may be incorporated into any other suitable gas turbine engine (e.g., a differently configured unducted rotor engine, ducted rotor engine, a turbofan engine, a turboshaft engine, a turboprop engine, a turbojet engine, etc.), or any other suitable combustion engine utilizing an applicable fluid transfer system that can benefit from damping of the vibrations of the associated engine.

As shown in FIG. 16, the fluid transfer system 300 may include one or more fluid conduits, such as first fluid conduit 214 and second fluid conduit 219 of FIG. 16. However, it should be appreciated that the fluid transfer system 300 may include additional fluid conduits. The fluid conduits described herein generally include tubes configured to transmit at least one of fuel, air, or oil between locations of the engine 10 for at least one of powering the engine 10, cooling components of the engine 10, or lubricating components of the engine 10, respectively. Furthermore, the fluid conduit(s) may include segments (e.g., first segment 216 and second segment 218 of the first fluid conduit 214). Segments of the fluid conduit(s) may be joined at one or more junctions 220 coupled between segments of a fluid conduit such that the sections of the fluid conduit are fluidly coupled to one another. Additionally, the fluid transfer system 300 may include a plurality of clamps 222 configured to couple the respective fluid conduits or sections of fluid conduits to the frame of the engine 10. In order to provide damping or reduce vibrations transferred to or through the fluid conduits from the frame of the engine 10, one or more SMA dampers may be provided in association with one or more of the fluid conduits and/or segments of the fluid conduit(s). Thus, the presently disclosed SMA dampers for the fluid transfer system 300 may reduce vibrations transferred to the fluid conduit(s) from the frame of the engine, may reduce vibrations transferred through an associated fluid conduit, and/or may reduce vibrations transferred between distinct fluid conduits or segments of a fluid conduit.

Figure 17:
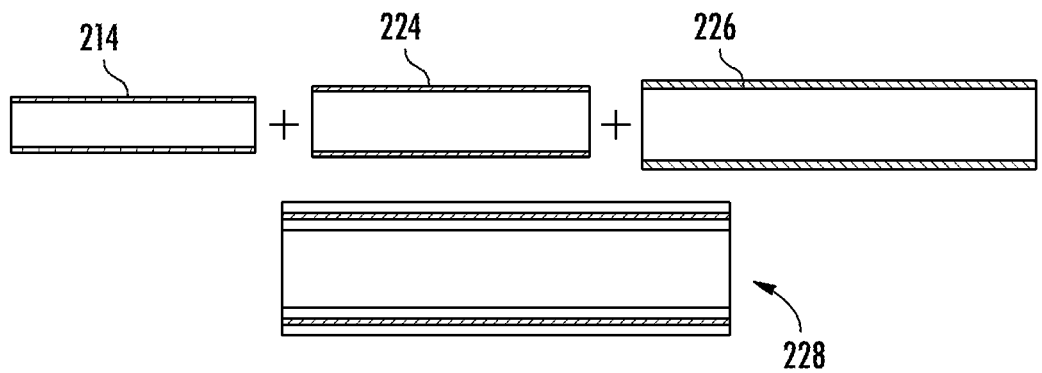
FIG. 17 is a schematic, cross-sectional view of a double fit SMA damped fluid conduit of a fluid transfer system for a gas turbine engine in accordance with another exemplary aspect of the present disclosure.

Referring now to FIG. 17, one embodiment of a double fit SMA damped fluid conduit is illustrated in accordance with aspects of the present disclosure. The disclosed double fit SMA damped fluid conduit 228 may be incorporated within the exemplary fluid transfer system 300 as described above with reference to FIG. 16, or, alternatively, may be incorporated into any other suitable fluid transfer system in association with a suitable gas turbine engine. As shown, a fluid conduit, such as first fluid conduit 214, may be cryogenically fit with a SMA tube or sleeve (SMA tube 224) generally utilizing a suitable cryogenic fit process, such as cryogenic fit process 207 described above with respect to FIG. 15. A single fit SMA damped fluid conduit may result from this single cryogenic fit process. Additionally, it may be desirable to provide an external exterior tube 226 for the single fit SMA damped fluid conduit in order to provide additional protection for the internal fluid conduit 214 and the SMA tube 224 surrounding such fluid conduit 214. Thus, as shown in FIG. 17, the resulting single fit SMA damped fluid conduit may be cryogenically fit with the exterior tube 226 utilizing the same or similar cryogenic fit process in order to produce a double fit SMA damped fluid conduit 228.

Figure 18:
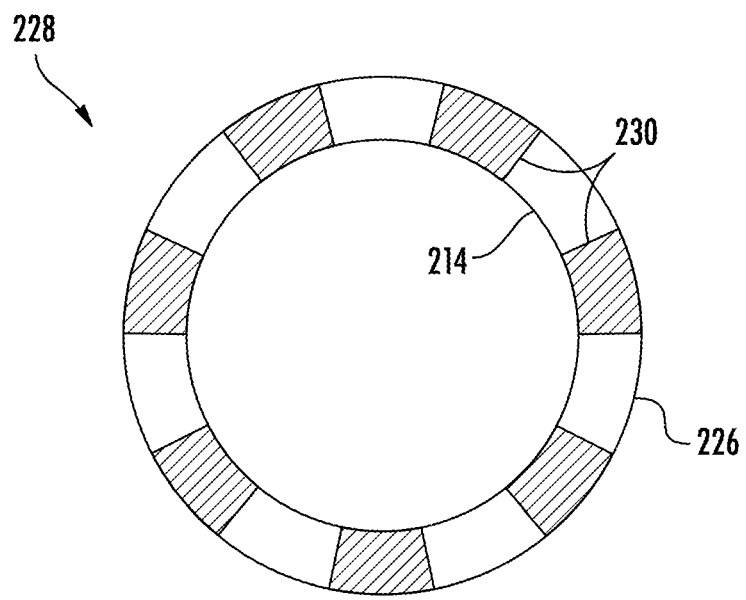
FIG. 18 is a schematic, cross-sectional view of an additional or alternative double fit SMA damped fluid conduit of a fluid transfer system for a gas turbine engine in accordance with another exemplary aspect of the present disclosure.

Referring now to FIG. 18, an additional or alternative embodiment of a double fit SMA damped fluid conduit is illustrated in accordance with aspects of the present subject matter. The double fit SMA damped fluid conduit 228 of FIG. 18 may generally be produced using the same or similar cryogenic fit processes as described above in respect with respect to FIG. 17. However, the double fit SMA damped fluid conduit 228 of FIG. 18 includes a plurality of SMA inserts 230 rather than the SMA tube of 224 of FIG. 17. While the SMA inserts 230 of FIG. 18 generally define trapezoidal shapes, it should be appreciated that the SMA inserts 230 may define any suitable shape or cross-sectional shape. For instance, the SMA inserts may be configured the same or similar to any of the embodiments of the SMA members 180, SMA elements 188, SMA plates 190, SMA springs 194, and/or SMA mesh ring 196 or segments of a SMA mesh ring 196 as described herein.

Figure 19:
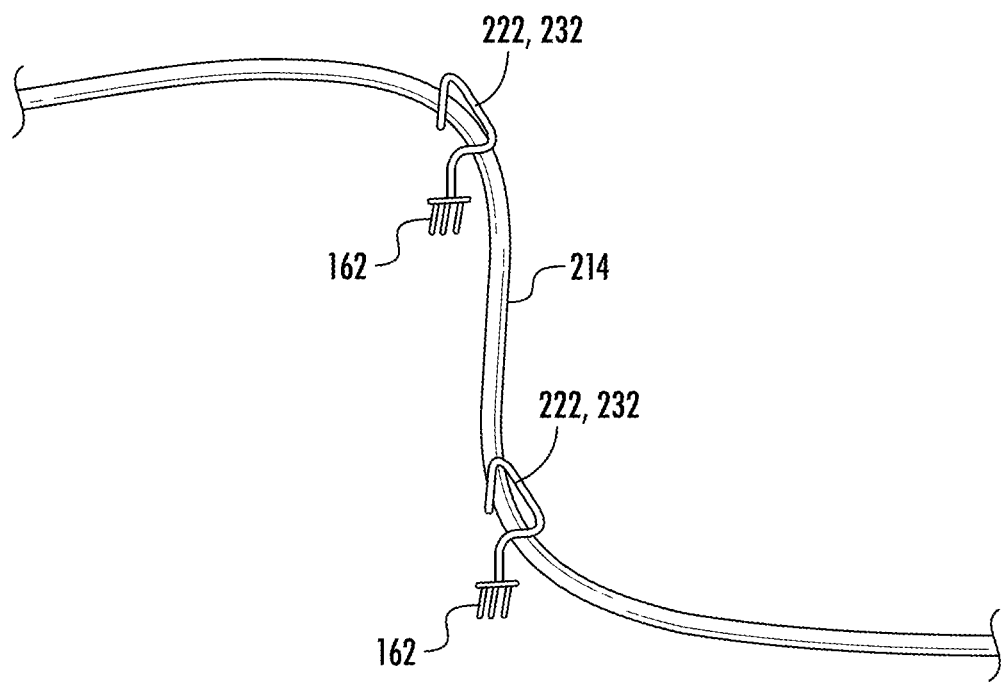
FIG. 19 is a schematic, pictorial view of SMA clamps of a fluid transfer system of a gas turbine engine in accordance with another exemplary aspect of the present disclosure.

Referring back to FIG. 16 in conjunction with FIG. 19, in an additional or alternative embodiment, one or more SMA dampers may be provided in association with the fluid conduit(s) in order to reduce vibrations transferred between the frame of the engine and the fluid conduit(s). For example, FIG. 19 illustrates the clamps of a fluid transfer system configured as SMA clamps. The disclosed SMA clamps 232 of FIG. 19 may be incorporated within the exemplary fluid transfer system 300 as described above with reference to FIG. 16, or, alternatively, may be incorporated into any other suitable fluid transfer system in association with a suitable gas turbine engine. For example, as shown, clamps 222 formed from a SMA material (SMA clamps 232) may be utilized to couple a fluid conduit, such as first fluid conduit 214, to a grounded structure 162 and/or the frame of the engine 10.

Referring now to FIG. 16, additionally, or alternatively, the fluid transfer system 300 may include one or more SMA bridges 234 coupled between distinct fluid conduits (e.g., first fluid conduit 214 and second fluid conduit 219) or between segments of the same fluid conduit (e.g., first segment 216 and second segment 218 of first fluid conduit 214). The SMA bridges 234 may generally reduce vibrations transferred through the fluid transfer system 300. The SMA bridge(s) 234 of FIG. 16 may generally be configured as any suitable element or member extending between respective fluid conduits or segments of a fluid conduit. For example, one or more SMA bridges 234 may be configured the same or similar to any of the embodiments of the SMA members 180, SMA elements 188, SMA springs 194, or the SMA extension 204 described herein, or any combination of the preceding.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

An epicyclic gearbox configured to be supported by a frame of a gas turbine engine and configured to transfer rotational motion between a first rotating component of the gas turbine engine and a second rotating component of the gas turbine engine, the gearbox comprising: a centrally located sun gear including a plurality of teeth; a plurality of planet gears circumscribing the sun gear, each of the planet gears including a plurality of teeth configured to mesh with the teeth of the sun gear such that rotation of the sun gear causes rotation of each planet gear of the plurality of planet gears; a ring gear circumscribing the plurality of planet gears, the ring gear including a plurality of teeth configured to mesh with the teeth of each of the planet gears such that the ring gear rotates relative to the plurality of planet gears; and at least one shape memory alloy damper provided in association with at least one of the sun gear, the ring gear, or the plurality of planet gears and configured in order to reduce vibrations transferred through the epicyclic gearbox to at least one of the frame of the gas turbine engine, the first rotating component, or the second rotating component.

The epicyclic gearbox of claim of any one of the previous clauses, further comprising: a planet carrier coupled to each planet gear of the plurality of planet gears and configured to be coupled to the frame of the gas turbine engine such that the planet carrier supports the epicyclic gearbox relative to the frame of the gas turbine engine.

The epicyclic gearbox of claim of any one of the previous clauses, further comprising: a planet carrier coupled to each planet gear of the plurality of planet gears and configured to be drivingly coupled to the first rotating component of the gas turbine engine.

The epicyclic gearbox of claim of any one of the previous clauses, further comprising: a planet carrier coupled to each planet gear of the plurality of planet gears and configured to be drivingly coupled to the second rotating component of the gas turbine engine.

The epicyclic gearbox of any one of the previous clauses, wherein the sun gear is configured to be drivingly coupled to the first rotating component of the gas turbine engine.

The epicyclic gearbox of any one of the previous clauses, wherein the ring gear is configured to be drivingly coupled to a second rotating component of the gas turbine engine.

The epicyclic gearbox of any one of the previous clauses, wherein the at least one shape memory alloy damper is provided in association with the planet carrier and configured such that vibrations transferred through the epicyclic gearbox are at least partially isolated from the frame of the gas turbine engine.

The epicyclic gearbox of any one of the previous clauses, wherein the at least one shape memory alloy damper is provided in association with the planet carrier and configured such that vibrations transferred through the epicyclic gearbox are at least partially isolated from the second rotating component of the gas turbine engine.

The epicyclic gearbox of any one of the previous clauses, wherein the at least one shape memory alloy damper is provided in association with the planet carrier and configured such that vibrations transferred through the epicyclic gearbox are at least partially isolated from the first rotating component of the gas turbine engine.

The epicyclic gearbox of any one of the previous clauses, wherein each planet gear of the plurality of planet gears defines a central bore within a central ring, wherein the planet carrier includes a plurality of layshafts, each layshaft of the plurality of layshafts corresponding to a planet gear of the plurality of planet gears, each layshaft extending in an axial direction within the central bore of its corresponding planet gear.

The epicyclic gearbox of any one of the previous clauses, the epicyclic gearbox further comprising: a plurality of bearing assemblies, each bearing assembly of the plurality of bearing assemblies associated with a layshaft and planet gear pair, each bearing assembly arranged between the central ring of the corresponding planet gear and an exterior surface the corresponding layshaft such that the bearing assembly allows relative rotation of the corresponding planet gear about its corresponding layshaft.

The epicyclic gearbox of any one of the previous clauses, further comprising: a plurality of shape memory alloy dampers of the at least one shape memory alloy damper configured as bearing dampers.

The epicyclic gearbox of any one of the previous clauses, wherein each bearing damper is arranged between the bearing assembly and the exterior surface of the layshaft of the associated layshaft and planet gear pair.

The epicyclic gearbox of any one of the previous clauses, wherein each bearing damper comprises a plurality of shape memory alloy members extending radially relative to the central bore between the exterior surface of the corresponding layshaft and the corresponding bearing assembly of the associated layshaft and planet gear pair.

The epicyclic gearbox of any one of the previous clauses, wherein each bearing damper comprises a shape memory alloy ring arranged within the central bore between the exterior surface of the layshaft and the corresponding bearing assembly of the associated layshaft and planet gear pair.

The epicyclic gearbox of any one of the previous clauses, wherein the plurality of shape memory alloy members includes a first set of shape memory alloy members extending radially relative to the central bore from the exterior surface of the corresponding layshaft to the shape memory alloy ring.

The epicyclic gearbox of any one of the previous clauses, wherein the plurality of shape memory alloy members includes a second set of shape memory alloy members extending radially relative to the central bore from the shape memory alloy ring to the corresponding bearing assembly of the associated layshaft and planet gear pair.

The epicyclic gearbox of any one of the previous clauses, wherein the bearing damper comprises a plurality of closed shape memory alloy elements.

The epicyclic gearbox of any one of the previous clauses, wherein each of the plurality of closed shape memory alloy elements is arranged between the exterior surface of the corresponding layshaft and the corresponding bearing assembly within the central bore of the planet gear of the associated layshaft and planet gear pair.

The epicyclic gearbox of any one of the previous clauses, wherein at least one bearing damper comprises a plurality of shape memory alloy plates.

The epicyclic gearbox of any one of the previous clauses, wherein each bearing damper comprises a plurality of shape memory alloy plates.

The epicyclic gearbox of any one of the previous clauses, wherein each of the plurality of shape memory alloy plates extends circumferentially relative to the central bore of the planet gear and is arranged between the exterior surface of the corresponding layshaft and the corresponding bearing assembly the associated layshaft and planet gear pair.

The epicyclic gearbox of any one of the previous clauses, wherein at least one bearing damper comprises a shape memory alloy mesh ring arranged between the exterior surface of the corresponding layshaft and the corresponding bearing assembly of the associated layshaft and planet gear pair.

The epicyclic gearbox of any one of the previous clauses, wherein each bearing damper comprises a shape memory alloy mesh ring arranged between the exterior surface of the corresponding layshaft and the corresponding bearing assembly of the associated layshaft and planet gear pair.

The epicyclic gearbox of any one of the previous clauses, wherein at least one bearing damper comprises a plurality of shape memory alloy coil springs extending radially relative to the central bore between the exterior surface of the corresponding layshaft and the corresponding bearing assembly of the associated layshaft and planet gear pair.

The epicyclic gearbox of any one of the previous clauses, wherein each bearing damper comprises a plurality of shape memory alloy coil springs extending radially relative to the central bore between the exterior surface of the corresponding layshaft and the corresponding bearing assembly of the associated layshaft and planet gear pair.

The epicyclic gearbox of any one of the previous clauses, further comprising a shape memory alloy damper of the at least one shape memory alloy damper configured as an isolating damper.

The epicyclic gearbox of any one of the previous clauses, wherein the isolating damper is coupled to the planet carrier and further configured to be coupled between the planet carrier and the frame of the gas turbine engine.

The epicyclic gearbox of any one of the previous clauses, wherein the isolating damper is coupled to the planet carrier and further configured to be coupled between the planet carrier and the second rotating component of the gas turbine engine.

The epicyclic gearbox of any one of the previous clauses, wherein the isolating damper is coupled to the planet carrier and further configured to be coupled between the planet carrier and the first rotating component of the gas turbine engine.

The epicyclic gearbox of any one of the previous clauses, further comprising: a first attachment structure coupled to the sun gear and further configured to be coupled to the first rotating component of the gas turbine engine.

The epicyclic gearbox of any one of the previous clauses, wherein the isolating damper is coupled to the first attachment structure and further configured to be coupled between the first attachment structure and the first rotating component of the gas turbine engine.

The epicyclic gearbox of any one of the previous clauses, wherein the sun gear is configured to be coupled to the frame of the gas turbine engine such that the sun gear supports the epicyclic gearbox relative to the frame of the gas turbine engine.

The epicyclic gearbox of any one of the previous clauses, further comprising: a first attachment structure coupled to the sun gear and further configured to be coupled to the frame of the gas turbine engine.

The epicyclic gearbox of any one of the previous clauses, wherein the isolating damper is coupled to the first attachment structure and further configured to be coupled between the first attachment structure and the frame of the gas turbine engine.

The epicyclic gearbox of any one of the previous clauses, further comprising: a first attachment structure coupled to the sun gear and further configured to be coupled to the second rotating component of the gas turbine engine.

The epicyclic gearbox of any one of the previous clauses, wherein the isolating damper is coupled to the first attachment structure and further configured to be coupled between the first attachment structure and the second rotating component of the gas turbine engine.

The epicyclic gearbox of any one of the previous clauses, wherein the isolating damper is coupled between the first attachment structure and the sun gear.

The epicyclic gearbox of any one of the previous clauses, further comprising: a second attachment structure coupled to the ring gear and further configured to be coupled to the second rotating component of the gas turbine engine.

The epicyclic gearbox of any one of the previous clauses, wherein the isolating damper is coupled to the second attachment structure and further configured to be coupled between the second attachment structure and the second rotating component of the gas turbine engine.

The epicyclic gearbox of any one of the previous clauses, wherein the ring gear is configured to be coupled to the frame of the gas turbine engine such that the ring gear supports the epicyclic gearbox relative to the frame of the gas turbine engine.

The epicyclic gearbox of any one of the previous clauses, further comprising: a second attachment structure coupled to the ring gear and further configured to be coupled to the frame of the gas turbine engine.

The epicyclic gearbox of any one of the previous clauses, wherein the isolating damper is coupled to the second attachment structure and further configured to be coupled between the second attachment structure and the frame of the gas turbine engine.

The epicyclic gearbox of any one of the previous clauses, further comprising: a second attachment structure coupled to the ring gear and further configured to be coupled to the first rotating component of the gas turbine engine.

The epicyclic gearbox of any one of the previous clauses, wherein the isolating damper is coupled to the second attachment structure and further configured to be coupled between the second attachment structure and the first rotating component of the gas turbine engine.

The epicyclic gearbox of any one of the previous clauses, wherein the isolating damper is coupled between the second attachment structure and the ring gear.

The epicyclic gearbox of any one of the previous clauses, wherein the at least one shape memory alloy damper is arranged on an exterior surface of the planet carrier such that at the least one shape memory alloy damper is configured to reduce vibrations transferred between the plurality of planet gears and the frame of the gas turbine engine.

The epicyclic gearbox of any one of the previous clauses, wherein the at least one shape memory alloy damper is arranged on an exterior surface of the planet carrier such that at the least one shape memory alloy damper is configured to reduce vibrations transferred between the plurality of planet carriers and the first rotating component of the gas turbine engine.

The epicyclic gearbox of any one of the previous clauses, wherein the at least one shape memory alloy damper is arranged on an exterior surface of the planet carrier such that at the least one shape memory alloy damper is configured to reduce vibrations transferred between the plurality of planet gears and the second rotating component of the gas turbine engine.

The epicyclic gearbox of any one of the previous clauses, wherein the at least one shape memory alloy damper is cryogenically fit onto the exterior surface of the planet carrier.

The epicyclic gearbox of any one of the previous clauses, wherein the at least one shape memory alloy damper is arranged on an exterior surface of the first attachment structure such that at the least one shape memory alloy damper is configured to reduce vibrations transferred between the sun gear and the first rotating component of the gas turbine engine.

The epicyclic gearbox of any one of the previous clauses, wherein the at least one shape memory alloy damper is arranged on an exterior surface of the first attachment structure such that at the least one shape memory alloy damper is configured to reduce vibrations transferred between the sun gear and the second rotating component of the gas turbine engine.

The epicyclic gearbox of any one of the previous clauses, wherein the at least one shape memory alloy damper is arranged on an exterior surface of the first attachment structure such that at the least one shape memory alloy damper is configured to reduce vibrations transferred between the sun gear and the frame of the gas turbine engine.

The epicyclic gearbox of any one of the previous clauses, wherein the at least one shape memory alloy damper is cryogenically fit onto the exterior surface of the first attachment structure.

The epicyclic gearbox of any one of the previous clauses, wherein the at least one shape memory alloy damper is arranged on an exterior surface of the second attachment structure such that at the least one shape memory alloy damper is configured to reduce vibrations transferred between the ring gear and the second rotating component of the gas turbine engine.

The epicyclic gearbox of any one of the previous clauses, wherein the at least one shape memory alloy damper is arranged on an exterior surface of the second attachment structure such that at the least one shape memory alloy damper is configured to reduce vibrations transferred between the ring gear and the first rotating component of the gas turbine engine.

The epicyclic gearbox of any one of the previous clauses, wherein the at least one shape memory alloy damper is arranged on an exterior surface of the second attachment structure such that at the least one shape memory alloy damper is configured to reduce vibrations transferred between the ring gear and the frame of the gas turbine engine.

The epicyclic gearbox of any one of the previous clauses, wherein the at least one shape memory alloy damper is cryogenically fit onto the exterior surface of the second attachment structure.

The epicyclic gearbox of any one of the previous clauses, wherein the second attachment structure includes a first segment and a second segment.

The epicyclic gearbox of any one of the previous clauses, wherein the at least one shape memory alloy damper is coupled between the first segment and the second segment of the second attachment structure.

The epicyclic gearbox of any one of the previous clauses, wherein the first segment is parallel to the second segment such that the second attachment structure defines a U-shape.

The epicyclic gearbox of any one of the previous clauses, wherein the first attachment structure includes a first segment and a second segment.

The epicyclic gearbox of any one of the previous clauses, wherein the at least one shape memory alloy damper is coupled between the first segment and the second segment of the first attachment structure.

The epicyclic gearbox of any one of the previous clauses, wherein the first segment is parallel to the second segment such that the first attachment structure defines a U-shape.

The epicyclic gearbox of any one of the previous clauses, wherein the first rotating component comprises at least one of a turbine or a component of a turbine section.

The epicyclic gearbox of any one of the previous clauses, wherein the second rotating component comprises at least one of a fan or a component of a fan assembly.

The epicyclic gearbox of any one of the previous clauses, wherein the second rotating component comprises at least one of a high pressure shaft, a high pressure turbine, a high pressure compressor, or a component of a high pressure rotor.

The epicyclic gearbox of any one of the previous clauses, wherein the first rotating component comprises at least one of a low pressure shaft, a low pressure turbine, a low pressure compressor, or a component of a low pressure rotor.

A fluid transfer system for use within a gas turbine engine, the fluid transfer system comprising: at least one fluid conduit comprising a tube configured to transmit at least one of fuel, air, or oil from a first location of the gas turbine engine to a second location of the gas turbine engine; and at least one shape memory alloy damper provided in association with the at least one fluid conduit configured to reduce vibrations acting on the at least one fluid conduit.

The fluid transfer system of the previous clause, wherein at least one shape memory alloy damper is arranged on an exterior surface of the tube of the at least one fluid conduit.

The fluid transfer system of any one of the previous clauses, wherein the at least one shape memory alloy damper is cryogenically fit onto the exterior surface of the tube.

The fluid transfer system of any one of the previous clauses, wherein the at least one shape memory alloy damper comprises at least one of a sheet or tube.

The fluid transfer system of any one of the previous clauses, further comprising: an exterior tube enclosing the tube of the at least one fluid conduit, the shape memory alloy damper arranged on the exterior surface of the tube.

The fluid transfer system of any one of the previous clauses, wherein the at least one shape memory alloy damper comprises at least one of a sheet or tube disposed between the exterior surface of the tube and the exterior tube.

The fluid transfer system of any one of the previous clauses, wherein the at least one shape memory alloy damper comprises a plurality of shape memory alloy inserts disposed between the exterior surface of the tube and the exterior tube.

The fluid transfer system of any one of the previous clauses, wherein the at least one shape memory alloy damper is cryogenically fit between the exterior surface of the tube and the exterior tube.

The fluid transfer system of any one of the previous clauses, wherein the at least one shape memory alloy damper comprises a shape memory alloy clamp configured to couple the tube of the at least one fluid conduit to a frame of the gas turbine engine.

The fluid transfer system of any one of the previous clauses, wherein the at least one fluid conduit comprises a first fluid conduit or a first tube segment and a second fluid conduit or a second tube segment.

The fluid transfer system of any one of the previous clauses, wherein the at least one shape memory alloy damper comprises a bridge coupled between the first fluid conduit or the first tube segment and the second fluid conduit or the second tube segment.

A gas turbine engine defining an axial direction, the gas turbine engine comprising: a frame; a turbine section comprising a turbine; and a fan assembly comprising a fan.

The gas turbine engine of any one of the previous clauses, wherein the gas turbine engine further comprises an epicyclic gearbox supported by the frame and coupling the turbine of the turbine section to the fan of the fan assembly, the epicyclic gearbox comprising: a centrally located sun gear including a plurality of teeth, the sun gear drivingly coupled to the turbine of the turbine section; a plurality of planet gears circumscribing the sun gear, each of the planet gears including a plurality of teeth configured to mesh with the teeth of the sun gear such that rotation of the sun gear causes rotation of each planet gear of the plurality of planet gears; a ring gear circumscribing the plurality of planet gears, the ring gear including a plurality of teeth configured to mesh with the teeth of each of the planet gears such that the ring gear rotates relative to the plurality of planet gears; and at least one shape memory alloy damper provided in association with at least one of the sun gear, the ring gear, or the plurality of planet gears such that vibrations transferred through the epicyclic gearbox to at least one of the frame of the gas turbine engine, the turbine, or the fan are reduced.

The gas turbine engine of any one of the previous clauses, wherein the epicyclic gearbox further comprises: a planet carrier coupled to each planet gear of the plurality of planet gears.

The gas turbine engine of any one of the previous clauses, wherein the planet carrier is coupled to the frame of the gas turbine engine such that the planet carrier supports the epicyclic gearbox relative to the frame of the gas turbine engine.

The gas turbine engine of any one of the previous clauses, wherein the ring gear is drivingly coupled to the fan of the fan assembly.

The gas turbine engine of any one of the previous clauses, wherein the planet carrier drivingly coupled to the fan of the fan assembly.

The gas turbine engine of any one of the previous clauses, wherein the ring gear is coupled to the frame of the gas turbine engine such that the ring gear supports the epicyclic gearbox relative to the frame of the gas turbine engine.

The gas turbine engine of any one of the previous clauses, wherein the at least one shape memory alloy damper is provided in association with the planet carrier such that vibrations transferred through the epicyclic gearbox are at least partially isolated from the frame of the gas turbine engine.

The gas turbine engine of any one of the previous clauses, wherein the at least one shape memory alloy damper is provided in association with the planet carrier such that vibrations transferred through the epicyclic gearbox are at least partially isolated from the fan of the gas turbine engine.

The gas turbine engine of any one of the previous clauses, wherein each planet gear of the plurality of planet gears defines a central bore within a central ring, wherein the planet carrier includes a plurality of layshafts, each layshaft of the plurality of layshafts corresponding to a planet gear of the plurality of planet gears, each layshaft extending in an axial direction within the central bore of its corresponding planet gear.

The gas turbine engine of any one of the previous clauses, wherein the epicyclic gearbox further comprises: a plurality of bearing assemblies, each bearing assembly of the plurality of bearing assemblies associated with a layshaft and planet gear pair, each bearing assembly arranged between the central ring of the corresponding planet gear and an exterior surface the corresponding layshaft such that the bearing assembly allows relative rotation of the corresponding planet gear about its corresponding layshaft.

The gas turbine engine of any one of the previous clauses, wherein a plurality of shape memory alloy dampers of the at least one shape alloy memory damper are configured as bearing dampers, each bearing damper arranged between the bearing assembly and the exterior surface of the layshaft of the associated layshaft and planet gear pair.

The gas turbine engine of any one of the previous clauses, wherein each bearing damper is arranged between the bearing assembly and the exterior surface of the layshaft of the associated layshaft and planet gear pair.

The gas turbine engine of any one of the previous clauses, wherein each bearing damper comprises a plurality of shape memory alloy members extending radially relative to the central bore between the exterior surface of the corresponding layshaft and the corresponding bearing assembly the associated layshaft and planet gear pair.

The gas turbine engine of any one of the previous clauses, wherein each bearing damper comprises a shape memory alloy ring arranged within the central bore between the exterior surface of the layshaft and the corresponding bearing assembly of the associated layshaft and planet gear pair.

The gas turbine engine of any one of the previous clauses, wherein the plurality of shape memory alloy members includes a first set of shape memory alloy members extending radially relative to the central bore from the exterior surface of the corresponding layshaft to the shape memory alloy ring.

The gas turbine engine of any one of the previous clauses, wherein the plurality of shape memory alloy members includes a second set of shape memory alloy members extending radially relative to the central bore from the shape memory alloy ring to the corresponding bearing assembly of the associated layshaft and planet gear pair.

The gas turbine engine of any one of the previous clauses, wherein the bearing damper comprises a plurality of closed shape memory alloy elements.

The gas turbine engine of any one of the previous clauses, wherein each of the plurality of closed shape memory alloy elements is arranged between the exterior surface of the corresponding layshaft and the corresponding bearing assembly within the central bore of the planet gear of the associated layshaft and planet gear pair.

The gas turbine engine of any one of the previous clauses, wherein at least one bearing damper comprises a plurality of shape memory alloy plates.

The gas turbine engine of any one of the previous clauses, wherein each bearing damper comprises a plurality of shape memory alloy plates.

The gas turbine engine of any one of the previous clauses, wherein each of the plurality of shape memory alloy plates extends circumferentially relative to the central bore of the planet gear and is arranged between the exterior surface of the corresponding layshaft and the corresponding bearing assembly of the associated layshaft and planet gear pair.

The gas turbine engine of any one of the previous clauses, wherein the at least one bearing damper comprises a shape memory alloy mesh ring arranged between the exterior surface of the corresponding layshaft and the corresponding bearing assembly of the associated layshaft and planet gear pair.

The gas turbine engine of any one of the previous clauses, wherein each bearing damper comprises a shape memory alloy mesh ring arranged between the exterior surface of the corresponding layshaft and the corresponding bearing assembly of the associated layshaft and planet gear pair.

The gas turbine engine of any one of the previous clauses, wherein at least one bearing damper comprises a plurality of shape memory alloy coil springs extending radially relative to the central bore between the exterior surface of the corresponding layshaft and the corresponding bearing assembly of the associated layshaft and planet gear pair.

The gas turbine engine of any one of the previous clauses, wherein each bearing damper comprises a plurality of shape memory alloy coil springs extending radially relative to the central bore between the exterior surface of the corresponding layshaft and the corresponding bearing assembly of the associated layshaft and planet gear pair.

The gas turbine engine of any one of the previous clauses, wherein the epicyclic gearbox further comprises: a shape memory alloy damper of the at least one shape memory alloy damper configured as an isolating damper.

The gas turbine engine of any one of the previous clauses, wherein the isolating damper is coupled between the planet carrier and the frame of the gas turbine engine.

The gas turbine engine of any one of the previous clauses, wherein the epicyclic gearbox further comprises: a first attachment structure coupled to the sun gear and coupled between the sun gear and the turbine of the turbine section.

The gas turbine engine of any one of the previous clauses, wherein the isolating damper is coupled to the first attachment structure and coupled between the first attachment structure and the turbine.

The gas turbine engine of any one of the previous clauses, wherein the isolating damper is coupled between the first attachment structure and the sun gear.

The gas turbine engine of any one of the previous clauses, wherein the epicyclic gearbox further comprises: a second attachment structure coupled to the ring gear and coupled between the ring gear and the fan of the gas turbine engine.

The gas turbine engine of any one of the previous clauses, wherein the isolating damper is coupled to the second attachment structure and coupled between the second attachment structure and the fan of the gas turbine engine.

The gas turbine engine of any one of the previous clauses, wherein epicyclic gearbox further comprises: a second attachment structure coupled to the ring gear and coupled between ring gear and the frame of the gas turbine engine.

The gas turbine engine of any one of the previous clauses, wherein the isolating damper is coupled to the second attachment structure and coupled between the second attachment structure and the frame of the gas turbine engine.

The gas turbine engine of any one of the previous clauses, wherein the isolating damper is coupled between the second attachment structure and the ring gear.

The gas turbine engine of any one of the previous clauses, wherein the at least one shape memory alloy damper is arranged on an exterior surface of the planet carrier such that the at least one shape memory alloy damper reduces vibrations transferred between the planet carrier and the frame of the gas turbine engine.

The gas turbine engine of any one of the previous clauses, wherein the at least one shape memory alloy damper is arranged on an exterior surface of the planet carrier such that at the least one shape memory alloy damper reduces vibrations transferred between the plurality of planet carriers and the fan of the gas turbine engine.

The gas turbine engine of any one of the previous clauses, wherein the at least one shape memory alloy damper is cryogenically fit onto the exterior surface of the planet carrier.

The gas turbine engine of any one of the previous clauses, wherein the at least one shape memory alloy damper is arranged on an exterior surface of the first attachment structure such that at the least one shape memory alloy damper reduces vibrations transferred between the sun gear and the turbine of the gas turbine engine.

The gas turbine engine of any one of the previous clauses, wherein the at least one shape memory alloy damper is cryogenically fit onto the exterior surface of the first attachment structure.

The gas turbine engine of any one of the previous clauses, wherein the at least one shape memory alloy damper is arranged on an exterior surface of the second attachment structure such that at the least one shape memory alloy damper reduces vibrations transferred between the ring gear and the fan of the gas turbine engine.

The gas turbine engine of any one of the previous clauses, wherein the at least one shape memory alloy damper is arranged on an exterior surface of the second attachment structure such that at the least one shape memory alloy damper reduces vibrations transferred between the ring gear and the frame of the gas turbine engine.

The gas turbine engine of any one of the previous clauses, wherein the at least one shape memory alloy damper is cryogenically fit onto the exterior surface of the second attachment structure.

The gas turbine engine of any one of the previous clauses, wherein the second attachment structure includes a first segment and a second segment.

The gas turbine engine of any one of the previous clauses, wherein the at least one shape memory alloy damper is coupled between the first segment and the second segment of the second attachment structure.

The gas turbine engine of any one of the previous clauses, wherein the first segment is parallel to the second segment such that the second attachment structure defines a U-shape.

The gas turbine engine of any one of the previous clauses, wherein the first attachment structure includes a first segment and a second segment.

The gas turbine engine of any one of the previous clauses, wherein the at least one shape memory alloy damper is coupled between the first segment and the second segment of the first attachment structure.

The gas turbine engine of any one of the previous clauses, wherein the first segment is parallel to the second segment such that the first attachment structure defines a U-shape.

The gas turbine engine of any one of the previous clauses, wherein the gas turbine engine further comprises a fluid transfer system, the fluid transfer system comprising: at least one fluid conduit comprising a tube configured to transmit at least one of fuel, air, or oil from a first location of the gas turbine engine to a second location of the gas turbine engine and at least one shape memory alloy damper provided in association with the at least one fluid conduit configured to reduce vibrations acting on the at least one fluid conduit.

The gas turbine engine of any one of the previous clauses, wherein the at least one shape memory alloy damper is arranged on an exterior surface of the tube of the at least one fluid conduit.

The gas turbine engine of any one of the previous clauses, wherein the at least one shape memory alloy damper is cryogenically fit onto the exterior surface of the tube.

The gas turbine engine of any one of the previous clauses, wherein the at least one shape memory alloy damper comprises at least one of a sheet or tube.

The gas turbine engine of any one of the previous clauses, wherein the fluid transfer system further comprises: an exterior tube enclosing the tube of the at least one fluid conduit, the shape memory alloy damper arranged on the exterior surface of the tube.

The gas turbine engine of any one of the previous clauses, wherein the at least one shape memory alloy damper comprises at least one of a sheet or tube disposed between the exterior surface of the tube and the exterior tube.

The gas turbine engine of any one of the previous clauses, wherein the at least one shape memory alloy damper comprises a plurality of shape memory alloy inserts disposed between the exterior surface of the tube and the exterior tube.

The gas turbine engine of any one of the previous clauses, wherein the at least one shape memory alloy damper is cryogenically fit between the exterior surface of the tube and the exterior tube.

The gas turbine engine of any one of the previous clauses, wherein the at least one shape memory alloy damper comprises a shape memory alloy clamp coupled between the tube of the at least one fluid conduit and the frame of the gas turbine engine.

The gas turbine engine of any one of the previous clauses, wherein the at least one fluid conduit comprises a first fluid conduit or a first tube segment and a second fluid conduit or a second tube segment.

The gas turbine engine of any one of the previous clauses, wherein the at least one shape memory alloy damper comprises a bridge coupled between the first fluid conduit or the first tube segment and the second fluid conduit or the second tube segment.

A gas turbine engine defining an axial direction, the gas turbine engine comprising: a frame; a first rotating component; a second rotating component; an epicyclic gearbox supported by the frame and coupling the first rotating component to the second rotating component, the epicyclic gearbox comprising: a centrally located sun gear including a plurality of teeth, the sun gear drivingly coupled to the first rotating component; a plurality of planet gears circumscribing the sun gear, each of the planet gears including a plurality of teeth configured to mesh with the teeth of the sun gear such that rotation of the sun gear causes rotation of each planet gear of the plurality of planet gears; a ring gear circumscribing the plurality of planet gears, the ring gear including a plurality of teeth configured to mesh with the teeth of each of the planet gears such that the ring gear rotates relative to the plurality of planet gears; and at least one shape memory alloy damper provided in association with at least one of the sun gear, the ring gear, or the plurality of planet gears such that vibrations transferred through the epicyclic gearbox to at least one of the frame of the gas turbine engine, the first rotating component, or the second rotating component are reduced; and at least one clutch drivingly coupled between the epicyclic gearbox and at least one of the first rotating component or the second rotating component.

The gas turbine engine of the previous clause, wherein the first rotating component comprises at least one of a turbine or a component of a turbine section.

The gas turbine engine of any the previous clauses, wherein the second rotating component comprises at least one of a fan or a component of a fan assembly.

The gas turbine engine of the previous clause, wherein the second rotating component comprises at least one of a turbine or a component of a turbine section.

The gas turbine engine of any the previous clauses, wherein the first rotating component comprises at least one of a fan or a component of a fan assembly.

The gas turbine engine of any the previous clauses, wherein the second rotating component comprises at least one of a high pressure shaft, a high pressure turbine, a high pressure compressor, or a component of a high pressure rotor.

The gas turbine engine of any the previous clauses, wherein the first rotating component comprises at least one of a low pressure shaft, a low pressure turbine, a low pressure compressor, or a component of a low pressure rotor.

The gas turbine engine of any the previous clauses, wherein the first rotating component comprises at least one of a high pressure shaft, a high pressure turbine, a high pressure compressor, or a component of a high pressure rotor.

The gas turbine engine of any the previous clauses, wherein the second rotating component comprises at least one of a low pressure shaft, a low pressure turbine, a low pressure compressor, or a component of a low pressure rotor.

The gas turbine engine of any the previous clauses, wherein the ring gear is drivingly coupled to the second rotating component.

The gas turbine engine of any of the previous clauses, further comprising: a planet carrier coupled between each planet gear of the plurality of planet gears and the frame of the gas turbine engine such that the planet carrier supports the epicyclic gearbox relative to the frame of the gas turbine engine.

The gas turbine engine of any of the previous clauses, further comprising: a planet carrier coupled between each planet gear of the plurality of planet gears and the second rotating component of the gas turbine engine.

The gas turbine engine of any of the previous clauses, wherein the epicyclic gearbox is configured as a power gearbox.

The gas turbine engine of any of the previous clauses, further comprising a clutch coupled between at least a portion of the first rotating component and the epicyclic gearbox.

The gas turbine engine of any of the previous clauses, further comprising a clutch coupled between at least a portion of the second rotating component and the epicyclic gearbox.

The gas turbine engine of any of the previous clauses, further comprising an accessory gearbox drivingly coupled to the first rotating component.

The gas turbine engine of any of the previous clauses, wherein the accessory gearbox comprises a sun gear, a ring gear, a plurality of planet gears, and at least one shape memory alloy damper provided in association with at least one of the sun gear, the ring gear, or the plurality of planet gears of the accessory gearbox and configured in order to reduce vibrations transferred through the accessory gearbox.

The gas turbine engine of any of the previous clauses, further comprising an electrical machine, the accessory gearbox drivingly coupled between the first rotating component and the electrical machine.

The gas turbine engine of any of the previous clauses, wherein the accessory gearbox is drivingly coupled to the first rotating component at a connection point, and wherein the clutch is positioned between the connection point and the epicyclic gearbox.

The gas turbine engine of any one of the previous clauses, wherein the gas turbine engine further comprises a third rotating component and an inter-spool clutch coupled between the first rotating component and the third rotating component.

The gas turbine engine of any of the previous clauses, wherein the inter-spool clutch is positioned along the first rotating component opposite the clutch relative to the connection point associated with the accessory gearbox.

The gas turbine engine of any of the previous clauses, wherein the third rotating component comprises at least one of a high pressure shaft, a high pressure turbine, a high pressure compressor, or a component of a high pressure rotor.

What is claimed is:

1. An epicyclic gearbox configured to be supported by a frame of a gas turbine engine and configured to transfer rotational motion between a first rotating component of the gas turbine engine and second rotating component of the gas turbine engine, the gearbox comprising:
a centrally located sun gear including a plurality of teeth, the sun gear configured to be drivingly coupled to e first rotating component of the gas turbine engine;
a plurality of planet gears circumscribing the sun gear, each planet gear of the plurality of planet gears including a plurality of teeth configured to mesh with the plurality of teeth of the sun gear such that rotation of the sun gear causes rotation of each planet gear of the plurality of planet gears, wherein the plurality of planet gears includes a first planet gear, the first planet gear including a central bore;
a ring gear circumscribing the plurality of planet gears, the ring gear including a plurality of teeth configured to mesh with the plurality of teeth of each planet gear of the plurality of planet gears such that the ring gear rotates relative to the plurality of planet gears;
a planet gear carrier, wherein each planet gear of the plurality of planet gears is rotatably attached to the planet gear carrier;
a layshaft having an exterior surface extending at least partially through the central bore of the first planet gear, wherein the layshaft is configured to couple to the frame of the gas turbine engine;
a bearing assembly having an inner race drivingly coupled to the first planet gear, wherein the inner race circumferentially surrounds at least a portion of the exterior surface of the layshaft; and
at least one shape memory alloy damper disposed between the exterior surface of the layshaft and the inner race of the bearing assembly wherein the at least one shape memory alloy damper is configured to reduce vibrations transferred through the epicyclic gearbox to at least one of the frame of the gas turbine engine, the first rotating component, or the second rotating component.

2. The epicyclic gearbox of claim 1, wherein the at least one shape memory alloy damper comprises a plurality of shape memory alloy members extending radially relative to the central bore between the exterior surface of the layshaft and the inner race of the bearing assembly.

3. The epicyclic gearbox of claim 2, wherein the at least one shape memory alloy damper comprises a shape memory alloy ring arranged within the central bore between the exterior surface of the layshaft and the inner race of the bearing assembly, and
wherein the plurality of shape memory alloy members includes a first set of shape memory alloy members extending radially relative to the central bore from the exterior surface of the layshaft to the shape memory alloy ring and a second set of shape memory alloy members extending radially relative to the central bore of the first planet gear from the shape memory alloy ring to the inner race of the bearing assembly.

4. The epicyclic gearbox of claim 1, wherein the at least one shape memory alloy damper comprises a plurality of closed shape memory alloy elements arranged between the exterior surface of the layshaft and the inner race of the bearing assembly within the central bore of the first planet gear.

5. The epicyclic gearbox of claim 1, wherein the at least one shape memory alloy damper comprises a plurality of shape memory alloy plates, each shape memory alloy plate of the plurality of shape memory ally plates extending circumferentially relative to the central bore of the planet gear and arranged between the exterior surface of the layshaft and the inner race of the bearing assembly.

6. The epicyclic gearbox of claim 1, wherein the at least one shape memory alloy damper comprises a shape memory alloy mesh ring arranged between the exterior surface of the layshaft and the inner race of the bearing assembly.

7. The epicyclic gearbox of claim 1, wherein the at least one shape memory alloy damper comprises a plurality of shape memory alloy coil springs extending radially relative to the central bore between the exterior surface of the layshaft and the inner race of the bearing assembly.

8. The epicyclic gearbox of claim 1, wherein the at least one shape memory alloy damper includes a second shape memory alloy damper configured as an isolating damper coupled to the planet carrier and further configured to be coupled between the planet carrier and the frame of the gas turbine engine.

9. The epicyclic gearbox of claim 1,
wherein the at least one shape memory alloy damper includes a second shape memory alloy damper arranged on an exterior surface of the planet carrier such that the second shape memory alloy damper is configured to reduce vibrations transferred between the plurality of planet gears and the frame of the gas turbine engine.

10. The epicyclic gearbox of claim 9, wherein the second shape memory alloy damper is cryogenically fit onto the exterior surface of the planet carrier.

11. The epicyclic gearbox of claim 1, further comprising:
an attachment structure coupled to the ring gear and further configured to be coupled to the second rotating component of the gas turbine engine, the attachment structure including a first segment and a second segment,
wherein the at least one shape memory alloy damper includes a second shape memory alloy damper coupled between the first segment and the second segment of the attachment structure.

12. The epicyclic gearbox of claim 11, wherein the first segment is parallel to the second segment such that the attachment structure defines a U-shape.

13. A gas turbine engine defining an axial direction, the gas turbine engine comprising:
a frame;
a turbine section comprising a turbine;
a fan assembly comprising a fan; and
an epicyclic gearbox supported by the frame and drivingly coupling the turbine of the turbine section to the fan of the fan assembly, the epicyclic gearbox comprising:
a centrally located sun gear including a plurality of teeth, the sun gear drivingly coupled to the turbine of the turbine section;
a plurality of planet gears circumscribing the sun gear, each planet gear of the plurality of planet gears including a plurality of teeth configured to mesh with the plurality of teeth of the sun gear such that rotation of the sun gear causes rotation of each planet gear of the plurality of planet gears, wherein the plurality of planet gears includes a first planet gear, the first planet gear including a central bore;
a ring gear circumscribing the plurality of planet gears, the ring gear including a plurality of teeth configured to mesh with the plurality of teeth of each planet gear of the plurality of planet gears such that the ring gear rotates relative to the plurality of planet gears;
a planet gear carrier, wherein each planet gear of the plurality of planet gears is rotatably attached to the planet gear carrier;
a layshaft having an exterior surface extending at least partially through the central bore of the first planet gear, wherein the layshaft is coupled to the frame;
a bearing assembly having an inner race drivingly coupled to the first planet gear, wherein the inner race circumferentially surrounds at least a portion of the exterior surface of the layshaft; and
at least one shape memory alloy damper disposed between the exterior surface of the layshaft and the inner race of the bearing assembly such that vibrations transferred through the epicyclic gearbox to at least one of the frame, the turbine, or the fan of the gas turbine engine are reduced.

14. The gas turbine engine of claim 13, wherein the at least one shape memory alloy damper includes a second shape memory alloy damper configured as an isolating damper coupled between the planet carrier and the frame of the gas turbine engine.

15. The gas turbine engine of claim 13, wherein the
at least one shape memory alloy damper includes a second shape memory alloy damper arranged on an exterior surface of the planet carrier such that the second shape memory alloy damper reduces vibrations transferred between the planet carrier and the frame of the gas turbine engine.

16. The gas turbine engine of claim 13, further comprising:
an attachment structure coupled between the ring gear and the fan of the fan assembly, the attachment structure including a first segment and a second segment,
wherein the at least one shape memory alloy damper includes a second shape memory alloy damper coupled between the first segment and the second segment of the attachment structure.

* * * * *